(12) United States Patent
Zou et al.

(10) Patent No.: US 11,055,507 B2
(45) Date of Patent: Jul. 6, 2021

(54) DISPLAY DEVICE WITH FINGERPRINT IDENTIFICATION AND DRIVING METHOD

(71) Applicant: XIAMEN TIANMA MICRO-ELECTRONICS CO., LTD., Xiamen (CN)

(72) Inventors: Zongjun Zou, Xiamen (CN); Ying Sun, Xiamen (CN); Yumin Xu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 16/458,874

(22) Filed: Jul. 1, 2019

(65) Prior Publication Data
US 2020/0202098 A1 Jun. 25, 2020

(30) Foreign Application Priority Data

Dec. 24, 2018 (CN) .......................... 201811580300.6

(51) Int. Cl.
| | | |
|---|---|---|
| G06F 3/045 | (2006.01) | |
| G06K 9/00 | (2006.01) | |
| G06F 3/041 | (2006.01) | |
| G06F 3/044 | (2006.01) | |
| G06K 9/20 | (2006.01) | |
| G09G 3/34 | (2006.01) | |
| G09G 3/36 | (2006.01) | |

(52) U.S. Cl.
CPC .......... *G06K 9/0004* (2013.01); *G06F 3/044* (2013.01); *G06F 3/0416* (2013.01); *G06K 9/2027* (2013.01); *G09G 3/3426* (2013.01); *G09G 3/3607* (2013.01)

(58) Field of Classification Search
CPC .. G06K 9/0004; G06K 9/2027; G06F 3/0416; G06F 3/044
USPC ......................................................... 345/174
See application file for complete search history.

(56) References Cited

U.S. PATENT DOCUMENTS

| | | | | |
|---|---|---|---|---|
| 2006/0033016 A1* | 2/2006 | Ogawa | .................... | G06F 3/042 250/221 |
| 2009/0028396 A1* | 1/2009 | Kishima | .............. | A61B 5/1172 382/124 |

(Continued)

FOREIGN PATENT DOCUMENTS

| | | |
|---|---|---|
| CN | 106022292 A | 10/2016 |
| CN | 107168469 A | 9/2017 |

*Primary Examiner* — Jonathan M Blancha
(74) *Attorney, Agent, or Firm* — Anova Law Group PLLC

(57) ABSTRACT

Display device and its driving method are provided. The display device includes pixels and optical sensors in a display area. The driving method includes detecting a touch control operation in the display area to determine a touch control area where the touch control operation is conducted and performing N fingerprint identification operations. Each fingerprint identification operation includes configuring a portion of pixels in the touch control area as bright pixels and a remain portion of the pixels in the touch control area as black pixels; and processing electrical signals from the plurality of optical sensors to retrieve fingerprint information where the plurality of optical sensors receives light signals and converts the light signals to the electrical signals. Each of the pixels in the touch control area is configured as bright pixels in at least one of the N fingerprint identification operations.

20 Claims, 23 Drawing Sheets

(56) References Cited

U.S. PATENT DOCUMENTS

| | | | |
|---|---|---|---|
| 2012/0200546 A1* | 8/2012 | Miyamoto | H01L 29/78633 345/205 |
| 2012/0293565 A1* | 11/2012 | Mito | G09G 3/3406 345/690 |
| 2013/0120321 A1* | 5/2013 | Nemoto | G06F 3/042 345/175 |
| 2013/0321366 A1* | 12/2013 | Kozuma | G06F 3/0421 345/204 |
| 2015/0331508 A1* | 11/2015 | Nho | H01L 27/323 345/173 |
| 2016/0125787 A1* | 5/2016 | Pyeon | G09G 3/2055 345/691 |
| 2018/0173926 A1* | 6/2018 | Wang | G06K 9/00033 |
| 2018/0315799 A1* | 11/2018 | Jiang | G09G 3/3208 |
| 2019/0087620 A1* | 3/2019 | Kim | G09G 3/3291 |

* cited by examiner

DISPLAY DEVICE WITH FINGERPRINT IDENTIFICATION AND DRIVING METHOD

CROSS-REFERENCES TO RELATED APPLICATION

This application claims the priority of Chinese Patent Application No. 201811580300.6, filed on Dec. 24, 2018, the content of which is incorporated herein by reference in its entirety.

TECHNICAL FIELD

The present disclosure generally relates to the field of display technology and, more particularly, relates to a display device and its driving method.

BACKGROUND

With continuous development of display technologies, display devices provide more and more functions. Different functions including a touch control sensing function, a motion sensing function, and/or a fingerprint identifying function, are integrated into the display devices. Fingerprint identification functions could recognize fingerprint information of users and then perform corresponding operations. Fingerprint identification functions provide high security and are favored by users.

Current display devices integrate optical sensors in display panels and use the optical sensors to achieve fingerprint identification. Light paths in the display panels are usually very complicated and the optical sensors are subject to too much interference, resulting in a low accuracy of fingerprint identification with a low user experience.

There is a need to solve technical problems to provide a display device and its driving method with a high accuracy of fingerprint identification.

SUMMARY

One aspect of the present disclosure provides a driving method for a display device including pixels and optical sensors in a display area. The driving method includes detecting a touch control operation in the display area to determine a touch control area where the touch control operation is conducted and performing N fingerprint identification operations. Each fingerprint identification operation includes: configuring a portion of the pixels in the touch control area as bright pixels and a remain portion of the pixels in the touch control area as black pixels; and processing electrical signals of the plurality of optical sensors to retrieve a fingerprint information, where the plurality of optical sensors receives light signals and to convert the light signals to electrical signals. Each of the pixels in the touch control area is controlled as a bright pixel in at least one of the N fingerprint identification operations where N is equal to or larger than 2.

Another aspect of the present disclosure provides a display device. The display device includes pixels and optical sensors in a display area. The display device is driven by a driving method. The driving method includes detecting a touch control operation in the display area to determine a touch control area where the touch control operation is conducted and performing N fingerprint identification operations. Each fingerprint identification operation includes: configuring a portion of the pixels in the touch control area as bright pixels and a remain portion of the pixels in the touch control area as black pixels; and processing electrical signals of the plurality of optical sensors to retrieve a fingerprint information, where the plurality of optical sensors receives light signals and to convert the light signals to electrical signals. Each of the pixels in the touch control area is controlled as a bright pixel in at least one of the N fingerprint identification operations where N is equal to or larger than 2.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
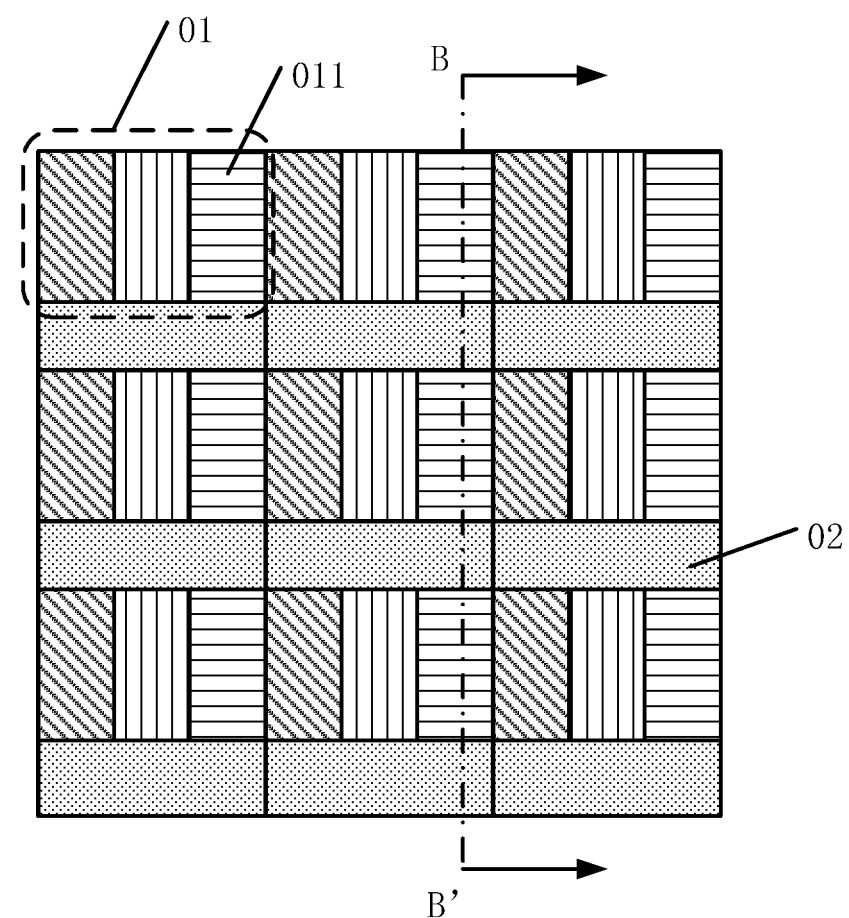
FIG. 1 illustrates a top-view of a part of a display panel.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

Optical sensors may be integrated into a display panel to achieve fingerprint identification. The optical sensors may be subject to serious interference, resulting in a low accuracy in the fingerprint identification.

Figure 2:
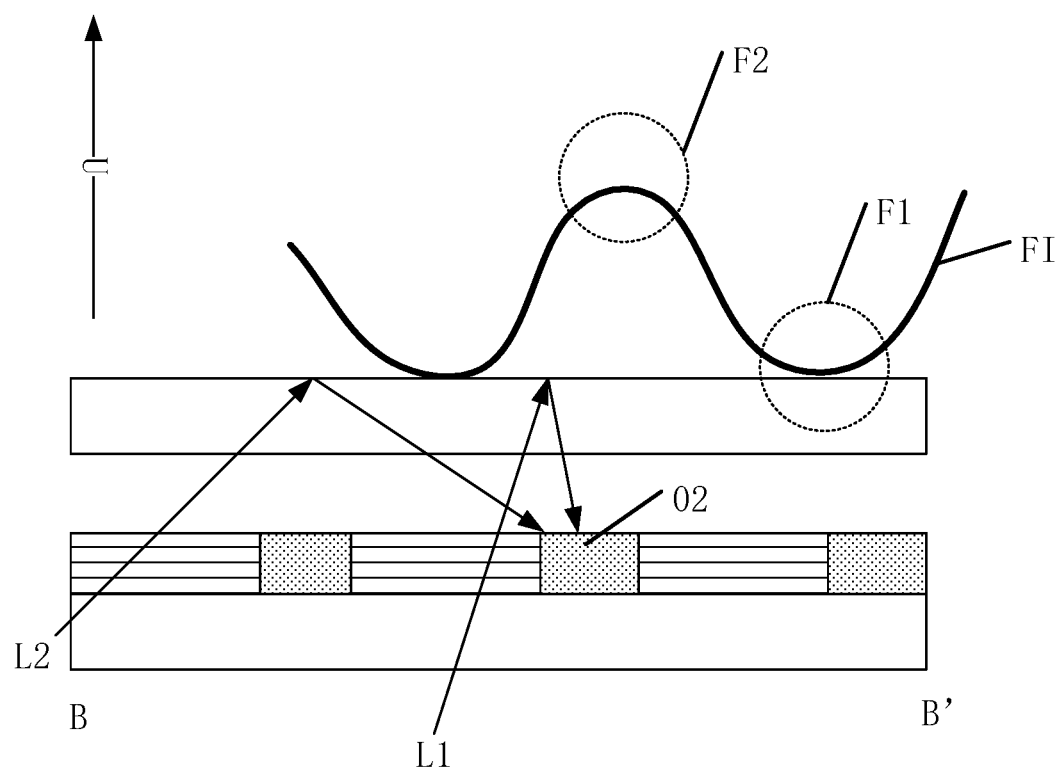
FIG. 2 illustrates a cross-section view of a structure of the display panel in FIG. 1 along a BB' direction.

FIG. 1 illustrates a top-view of a part of a display panel; and FIG. 2 illustrates a cross-section view of a structure of the display panel in FIG. 1 along a BB' direction. The display panel may include a plurality of pixels 01 and a plurality of optical sensors 02. Each of the plurality of pixel 01 may include three sub-pixels 011 corresponding to three different colors respectively. When performing a fingerprint identification operation, a finger F1 may press the display panel. The finger F1 may have fingerprint bridges F1 and fingerprint valleys F2. The fingerprint bridges F1 may be in contact with a surface of the display panel and the fingerprint valleys F2 may not contact the surface of the display panel. Correspondingly, a portion of light beams L1 incident to the display panel corresponding to the fingerprint bridges F1 and a remaining portion of light beams L1 incident to the display panel corresponding to the fingerprint valleys F2 may have different reflection rates. The optical sensors 02 may receive reflected light beams. A first portion of the reflecting light beams formed at the fingerprint bridges F1 and a second portion of the reflecting light beams formed at the fingerprint valleys F2 may have different intensities, and then may be converted to optical currents with different amplitude respectively. The display panel may identify the fingerprint bridges F1 and the fingerprint valleys F2 according to the amplitude of the optical currents in the plurality of optical sensors 02, and the amplitude of the optical currents in the plurality of optical sensors 02 may be integrated to identify the fingerprint.

In an ideal condition, each of the plurality of optical sensors 02 may be used to identify a portion of the fingerprint in a direction perpendicular to this one of the plurality of optical sensors 02. The direction perpendicular to one of the plurality of optical sensors 02 may be a direction U, and the light beams L1 which form a small angle with the direction U may be used as effective fingerprint identification light beams, and the light beams L2 which form a large angle with the direction U may be used as interference light beams. The light beams L2 which form a large angle with the direction U may cross a large distance after being reflected by the surface of the display panel. Correspondingly, one of the plurality of optical sensors 02 may detect a portion of the fingerprint information far away from this one of the plurality of optical sensors 02, and may use a portion of the fingerprint information far away from this one of the plurality of optical sensors 02 as the effective fingerprint information in the direction perpendicular to this one of the plurality of optical sensors 02. Correspondingly, the light beams L2 which form a large angle with the direction U may reduce the accuracy of the fingerprint identification and influence the user experience.

Figure 3:
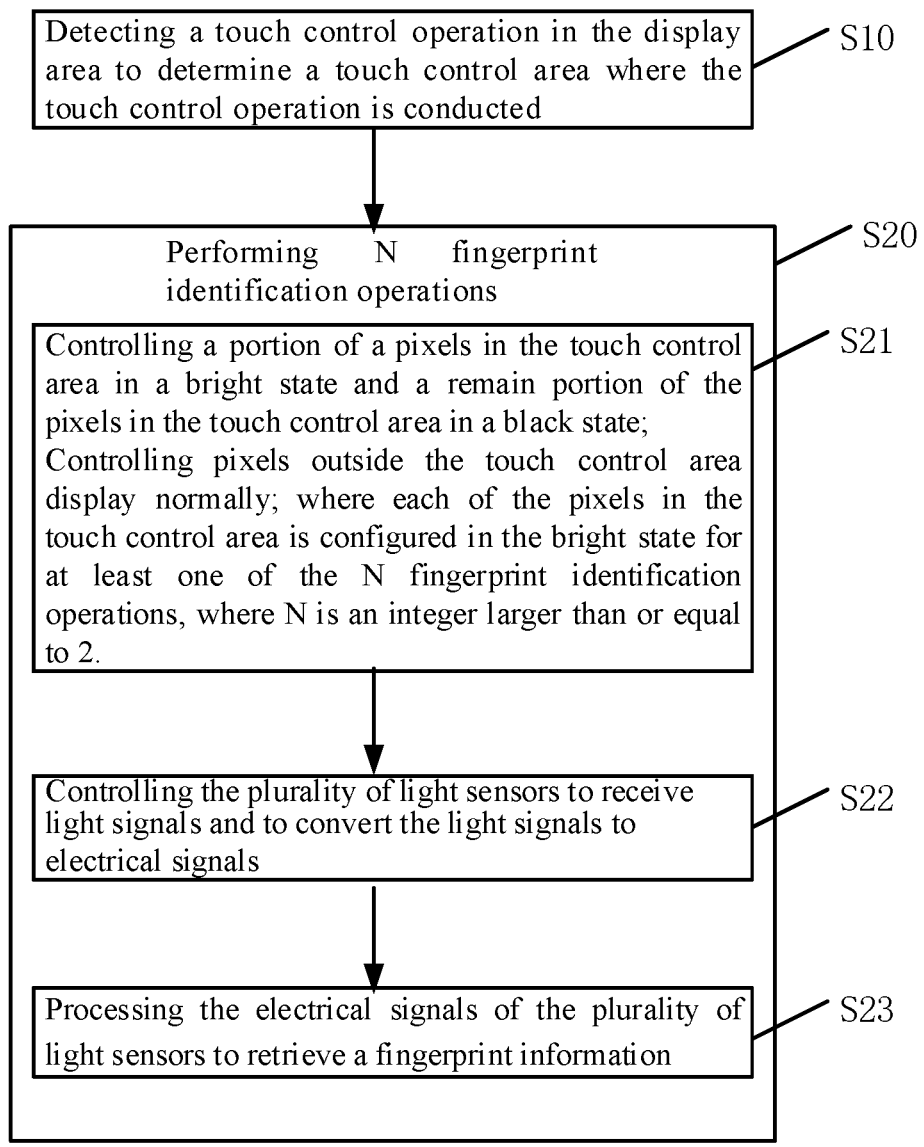
FIG. 3 illustrates an exemplary driving method for a display device consistent with various disclosed embodiments in the present disclosure.
Figure 4:
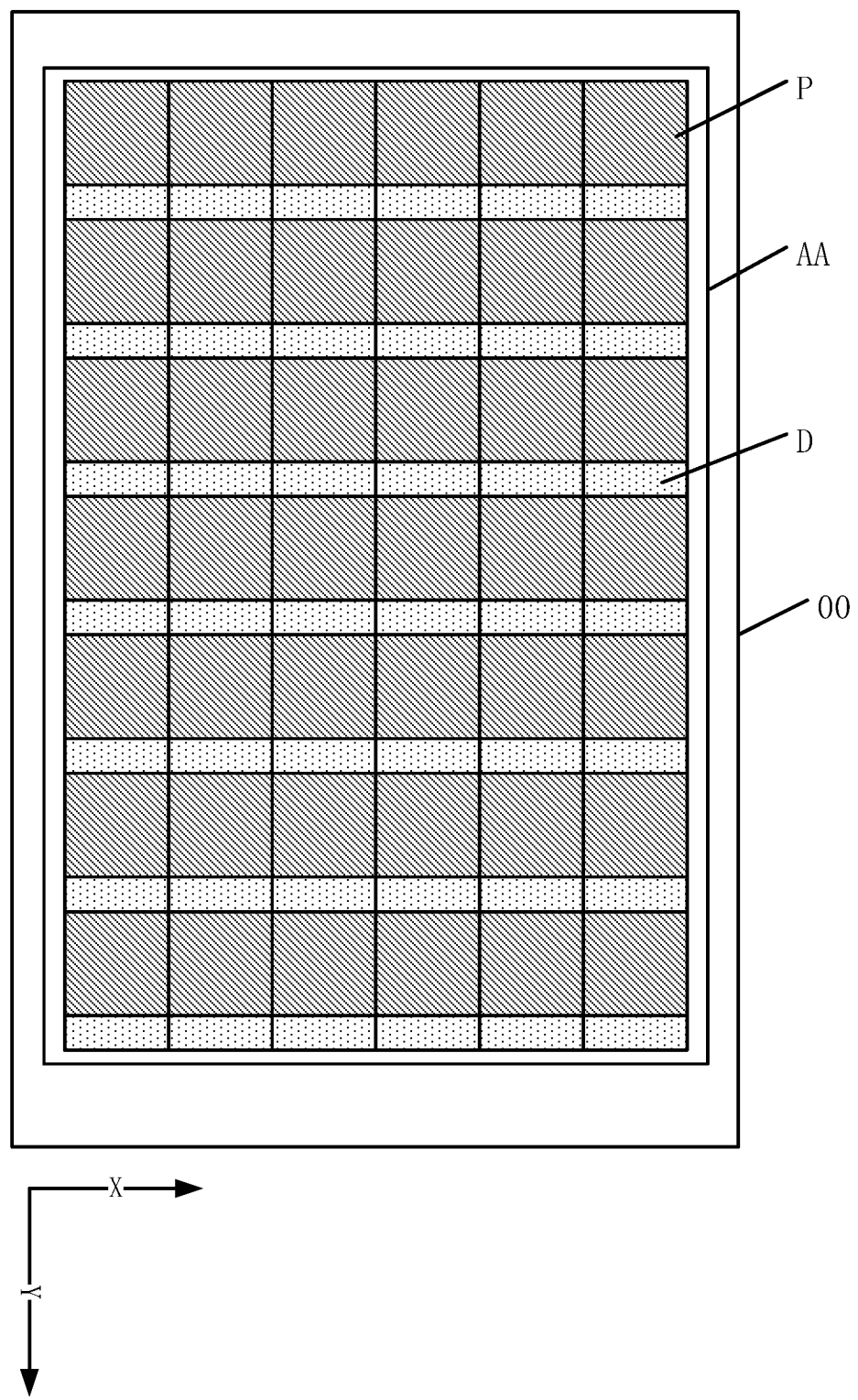
FIG. 4 illustrates an exemplary display device consistent with various disclosed embodiments in the present disclosure.
Figure 5:
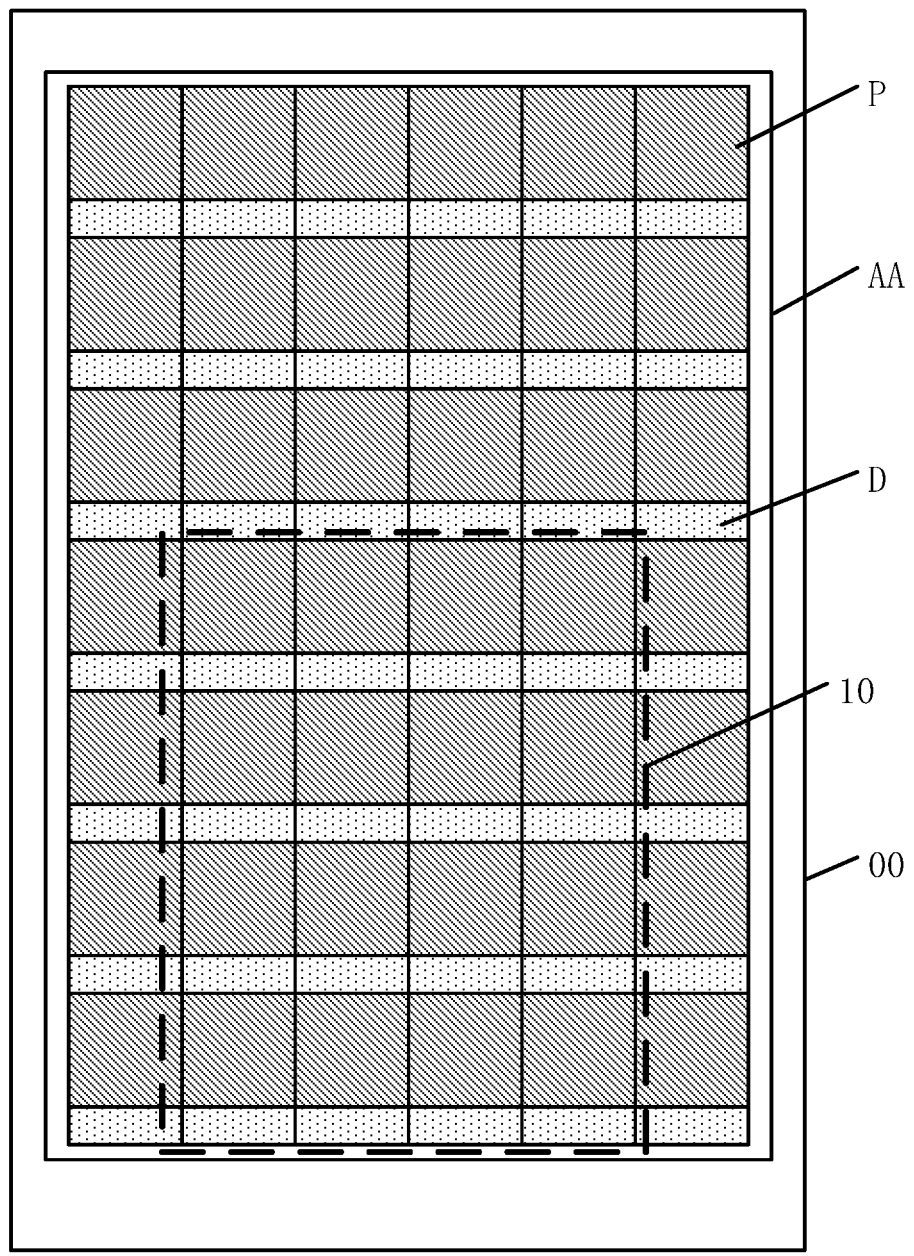
FIG. 5 illustrates a structure of an exemplary display device corresponding to the step S10 in FIG. 3 consistent with various disclosed embodiments in the present disclosure.
Figure 6:
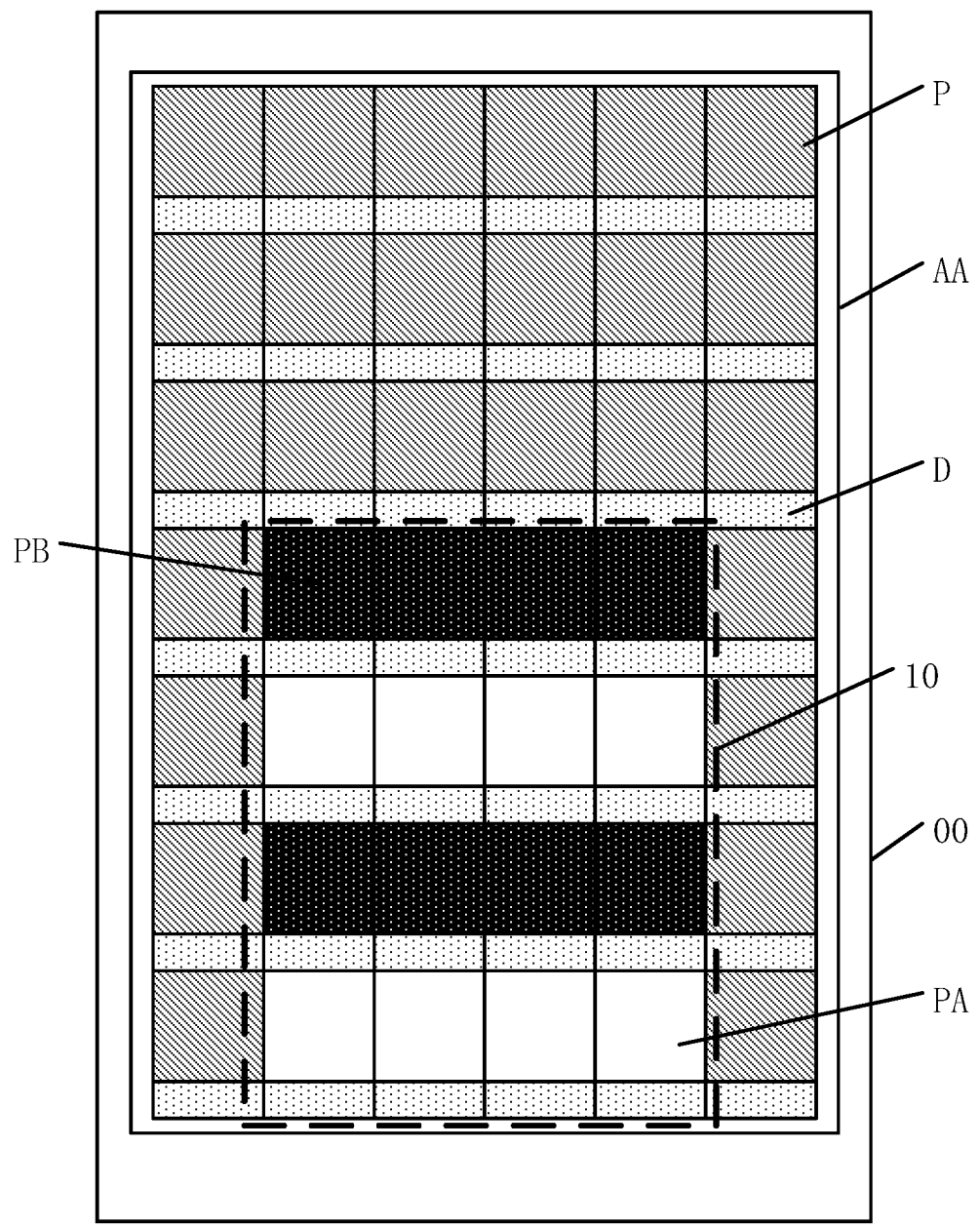
FIG. 6 illustrates a structure of an exemplary display device corresponding to the step S21 in FIG. 3 consistent with various disclosed embodiments in the present disclosure.
Figure 7:
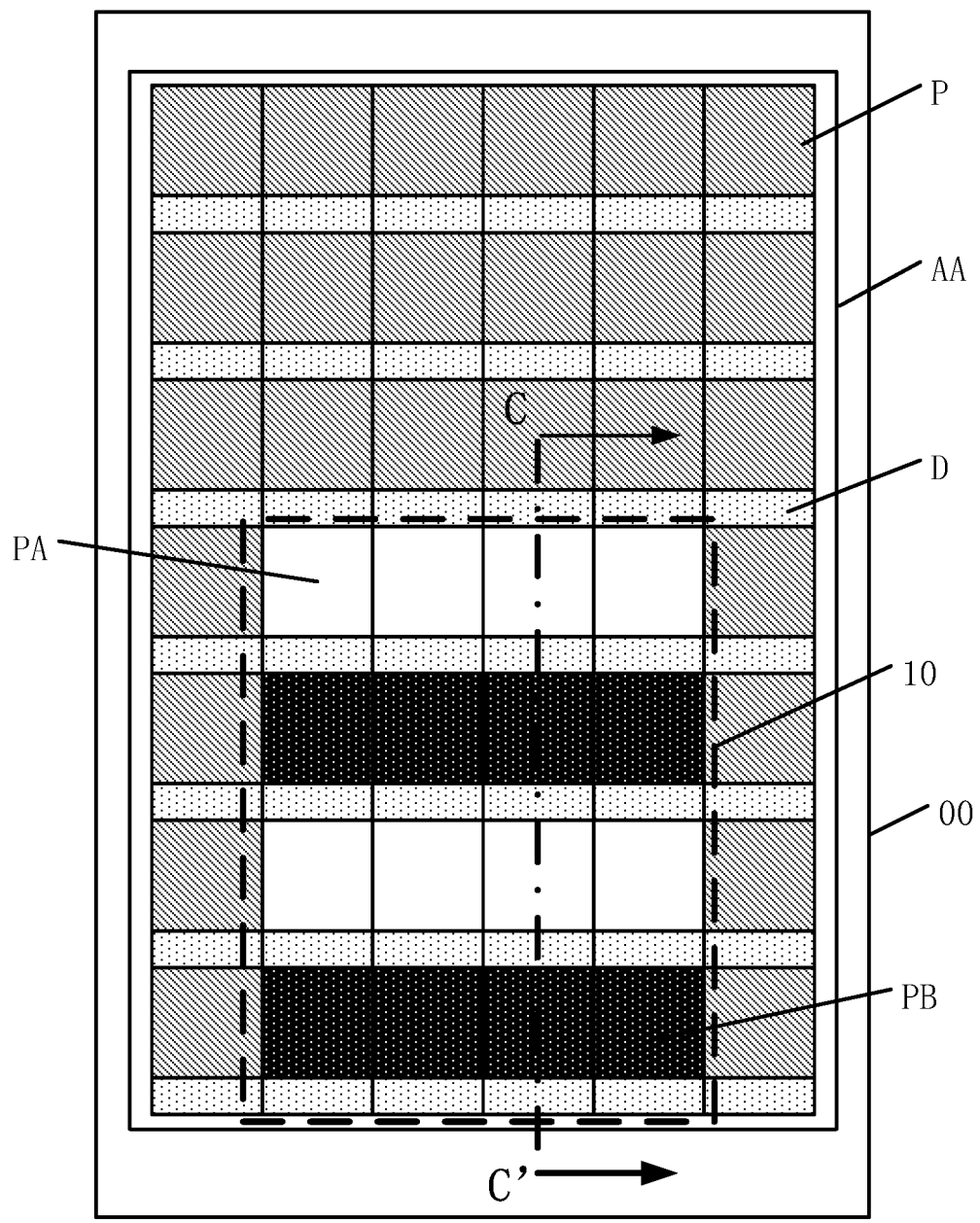
FIG. 7 illustrates a structure of another exemplary display device corresponding to the step S10 in FIG. 3 consistent with various disclosed embodiments in the present disclosure.
Figure 8:
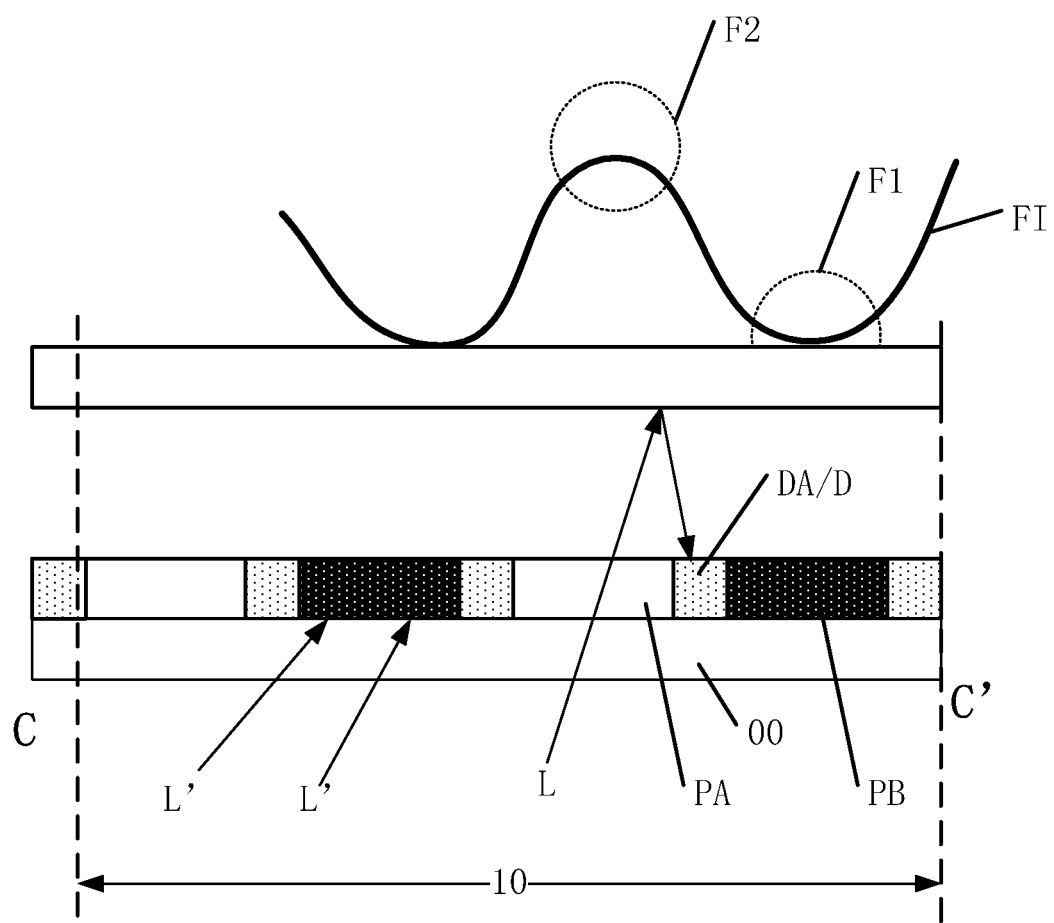
FIG. 8 illustrates a cross-section view of the display device in FIG. 7 along a CC' direction.

The present disclosure provides a driving method for a display device as illustrated in FIGS. 3-8. FIG. 3 illustrates an exemplary driving method for a display device consistent with various disclosed embodiments in the present disclosure; FIG. 4 illustrates an exemplary display device consistent with various disclosed embodiments in the present disclosure; FIG. 5 illustrates a structure of an exemplary display device corresponding to the step S10 in FIG. 3 consistent with various disclosed embodiments in the present disclosure; FIG. 6 illustrates a structure of an exemplary display device corresponding to the step S21 in FIG. 3 consistent with various disclosed embodiments in the present disclosure; FIG. 7 illustrates a structure of another exemplary display device corresponding to the step S10 in FIG. 3 consistent with various disclosed embodiments in the present disclosure; FIG. 8 illustrates a cross-section view of the display device in FIG. 7 along a CC' direction.

In one embodiment, as illustrated in FIGS. 3-4, a display device may include a display region AA. The display region AA may include a plurality of pixels P and a plurality of optical sensors D. In one embodiment, the plurality of pixels P and the plurality of optical sensors D may be disposed on a substrate panel 00.

In one embodiment, as illustrated in FIG. 3, the driving method may include following steps from Step S10 to Step S20.

Step S10: the display panel may detect a touch control operation in the display region AA to determine a touch control area 10 where the touch control operation is conducted.

As illustrated in FIG. 5, when a finger presses the display region AA of the display device, the display device may retrieve a position information of the touch control operation, to determine the touch control area 10 where the touch control operation is conducted. The touch control area 10 may be an area of the display device that the finger presses. The plurality of pixels P may include pixels in the touch control area 10 and pixels outside the touch control area 10.

Step S20: the display panel may perform N fingerprint identifying operations.

Each fingerprint identifying operation may include the following Step S21 to Step S23.

Step S21: a portion of the pixels P in the touch control area 10 may be configured as bright pixels and a remaining portion of the pixels P in the touch control area 10 be configured as black pixels. The pixels P outside the touch control area 10 may be controlled to display normally.

In the N fingerprint identifying operations, each of the pixels P in the touch control area 10 may be controlled as a bright pixel in at least one of the N fingerprint identifying operations. N may be an integer larger than or equal to 2.

As illustrated in FIGS. 6-7, in the N fingerprint identifying operations, a portion PA of the pixels in the touch control area 10 may be controlled as the bright pixels PA. A remaining portion PB of the pixels in the touch control area 10 except the bright pixels PA may be controlled as the black pixels PB.

When the display device is a self-luminous display device such as an organic light-emitting display device, the bright pixels PA may mean that organic light-emitting diodes of the bright pixels PA are in a conductive light-emitting state, and the black pixels PB may mean that organic light-emitting diodes of the black pixels PB are in an off state.

When the display device is a passive luminous display device such as a liquid crystal display device, the bright pixels PA may mean that light is transmitted through the pixels PA, and the black pixels PB may mean that no light is transmitted through the pixels PB.

In one embodiment, the fingerprint identifying operations may be performed at least twice. The embodiment illustrated in FIGS. 6-7 uses a driving method where the fingerprint identifying operations are performed twice (N=2) as an example only to describe the present disclosure and should not limit scopes of the present disclosure. In various embodiments of the present disclosure, the fingerprint identifying operations may be performed any suitable times. The present disclosure has no limit on this. In one embodiment where the fingerprint identifying operations are performed twice (N=2), FIG. 6 illustrates a status of the display device when a first fingerprint identifying operation is performed and FIG. 7 illustrates a status of the display device where a second fingerprint identifying operation is performed.

The embodiment illustrated in FIGS. 6-7 uses a driving method where each of the pixels P in the touch control area 10 is controlled as a bright pixel only in one of the N fingerprint identifying operations as an example to describe the present disclosure for description purposes only, and should not limit scopes of the present disclosure. The present disclosure has no limit on this and a portion of the pixels P in the touch control area 10 may be controlled as the bright pixels in both two fingerprint identifying operations in some embodiments.

The embodiment illustrated in FIGS. 6-7 uses a driving method where a number of the bright pixels PA in the touch control area 10 is equal to a number of the black pixels PB in the touch control area 10 as an example only to describe the present disclosure and should not limit scopes of the present disclosure. For example, in some embodiments, the number of the bright pixels PA may be different from the number of the black pixels PB in the touch control area 10.

When performing the N fingerprint identifying operations, the pixels P outside the touch control area 10 may be controlled to display normally. Since the touch control area 10 is the area which the finger presses and is invisible to users' eyes, the pixels in the touch control area 10 controlled as the bright pixels and/or as the black pixels may have a small influence or even have no influence on a display performance of the display device. An area outside the touch control area 10 may not be pressed by the finger and may still display normally. In the driving method provided by various embodiments of the present disclosure, the display device may perform the fingerprint identification and display images simultaneously. Functions and application fields of the display device may be enriched, and a user experience may be improved.

Step S22: the plurality of optical sensors D may receive light signals and convert the light signals to electrical signals.

Step S23: the electrical signals of the plurality of optical sensors D may be processed for retrieving a fingerprint information.

In one embodiment, a processor (not shown in the figures) may be disposed in the display device. The processor may receive the electrical signals from the plurality of optical sensors D in the touch control area 10 and then may compute and/or analyze the electrical signals of the plurality of optical sensors D to retrieve the fingerprint information.

The display device provided by various embodiments of the present disclosure may improve a fingerprint identification accuracy. As illustrated in FIG. 7 and FIG. 8 which is a cross-section view of the display device in FIG. 7 along a CC' direction. In the N fingerprint identification operations, a portion PA of the pixels in the touch control area 10 may be controlled as the bright pixels and a remaining portion PB of the pixels in the touch control area 10 may be controlled as the black pixels. Each of the plurality of optical sensor D may sense the light beams mainly from the bright pixels PA in a position corresponding to this one of the plurality of optical sensors D since the black pixels PB may not emit light or no light beams may transmit through the black pixels PB. Correspondingly, reflected light beams which are corresponding to light beams L' with a large angle and are sensed by this one of the plurality of optical sensors D may be reduced. An influence of the reflected light beams from the light beams L' which form a large incident angle on the fingerprint identification accuracy may be reduced and user experience may be improved.

For description purposes only, the embodiment in FIG. 8 where the display device is a passive light-emitting display device is used as an example to illustrate the present disclosure and should not limit the scopes of the present disclosure. The display device in the present disclosure may be any suitable display device.

In one embodiment, in the N fingerprint identification operations, each of the pixels P in the touch control area 10 may be controlled as a bright pixel at least in one of the N fingerprint identification operation. In the N fingerprint identification operations, each of the pixels P in the touch control area 10 may emit light or transmit light beams. Then the light beams may propagate to a part of the fingerprint in a position of the corresponding one of the pixels P in the touch control area 10, to make the plurality of optical sensors D perform the fingerprint identification operation.

In the driving method for the display device provided by the present disclosure, the display region AA in the display device may include the plurality of pixels P and the plurality of optical sensors D. The driving method may include detecting the touch control operation in the display region AA to determine the touch control area 10 and then performing at least two fingerprint identification operations. The plurality of pixels P may include the pixels in the touch control area 10 and the pixels outside the touch control area 10. In the at least two fingerprint identification operations, a portion of the pixels in the touch control area 10 may be controlled as the bright pixels and the remaining portion of the pixels in the touch control area 10 may be controlled as the black pixels. The pixels P outside the touch control area 10 may display normally. In the at least two fingerprint identification operations, each of the pixels P in the touch control area 10 may be controlled as the bright pixel at least in one of the at least two fingerprint identification operations. The plurality of optical sensors D may receive light signals and then convert the light signals to electrical signals. The electrical signals from the plurality of optical sensors D may be processed to retrieve a fingerprint information. An influence of the reflected light beams which are corresponding to the light beams L' with a large angle on the fingerprint identification accuracy may be reduced and user experience may be improved.

In one embodiment illustrated in FIG. 4, the plurality of pixels P may be disposed in an array along a first direction X and a second direction Y. The first direction X may intersect the second direction Y. For description purposes only, the embodiment where the plurality of pixels P is disposed in a configuration shown in FIG. 4 is used as an example to illustrate the present disclosure and should not limit the scopes of the present disclosure. In various embodiments, the plurality of pixels P may be disposed in any suitable configurations.

In one embodiment illustrated in FIGS. 3-8, each of the pixels P in the touch control area 10 may be controlled as the bright pixel only in one of the N fingerprint identification operations. The light beams may propagate to a part of the fingerprint in a position corresponding to the corresponding one of the pixels P in the touch control area 10 to make the plurality of optical sensors D perform the fingerprint identification. And the bright pixels PA in each fingerprint identification operation may not repeat, improving a fingerprint identification efficiency.

In the driving method of the present disclosure, the plurality of optical sensors may be used to perform the fingerprint identification operations. The plurality of optical sensors may convert the light signals to the electrical current signals. The electrical current signals may be large if the light signals are large. It may be easy to detect and identify the large electrical current signals. The fingerprint identification accuracy may be improved.

In some embodiments of the present disclosure, a grayscale of the bright pixels may be increased in the N fingerprint identification operations, to further improve the fingerprint identification accuracy. A method to increase the grayscale of the bright pixels consistent with various embodiments of the present disclosure is illustrated below.

In some embodiments of the present disclosure, as illustrated in FIGS. 3-8, the bright pixels PA in the touch control area 10 may be controlled with a brightness of a $255^{th}$ grayscale.

A brightness change between a brightest state and a darkest state of the display device may be divided into several parts, and the grayscale may represent different brightness from the darkest state to the brightest state. An image may be rendered more delicately when a number of brightness levels/grayscales from the darkest state to the brightest is larger. In one embodiment of the present disclosure, the display device may have $2^8=256$ brightness levels which are 256 grayscales (a $0^{th}$ grayscale to a $255^{th}$ grayscale).

In one embodiment, the brightness of the bright pixels PA in the touch control area 10 may be controlled with the $255^{th}$ grayscale which is the brightest state. A portion of the plurality of optical sensors in positions corresponding to the bright pixels PA may receive more light beams and the electrical currents converted by this portion of the plurality of optical sensors may be large. It may be easy to detect and identify the large electrical current signals. The fingerprint identification accuracy may be improved.

In some other embodiments, as illustrated in FIGS. 3-8, a pixel voltage of one of the plurality of pixels P with a brightness of the $255^{th}$ grayscale may be V1. In the N fingerprint identification operations, the bright pixels PA in the touch control area 10 may have a pixel voltage V2 larger than V1.

The display device may have $2^8=256$ brightness levels which are 256 grayscales (the $0^{th}$ grayscale to $255^{th}$ grayscale) when it displays normally. One of the plurality of pixels P may need a pixel voltage of V1 to display the $255^{th}$ grayscale. The pixel voltage may be provided to a pixel electrode corresponding to the one of the plurality of pixels through a data line.

In one embodiment, an over-gamma-driving method may be adopted. A pixel voltage V2 larger than V1 may be provided to one of the bright pixels PA in the touch control area 10, and then the one of the bright pixels PA in the touch control area 10 may have an ultra-high brightness. Corresponding one of the plurality of optical sensors D may receive more light beams. Then the electrical currents converted by this one of the plurality of optical sensors D may increase and may be detected/identified easily. The fingerprint identification accuracy may be improved.

Figure 9:
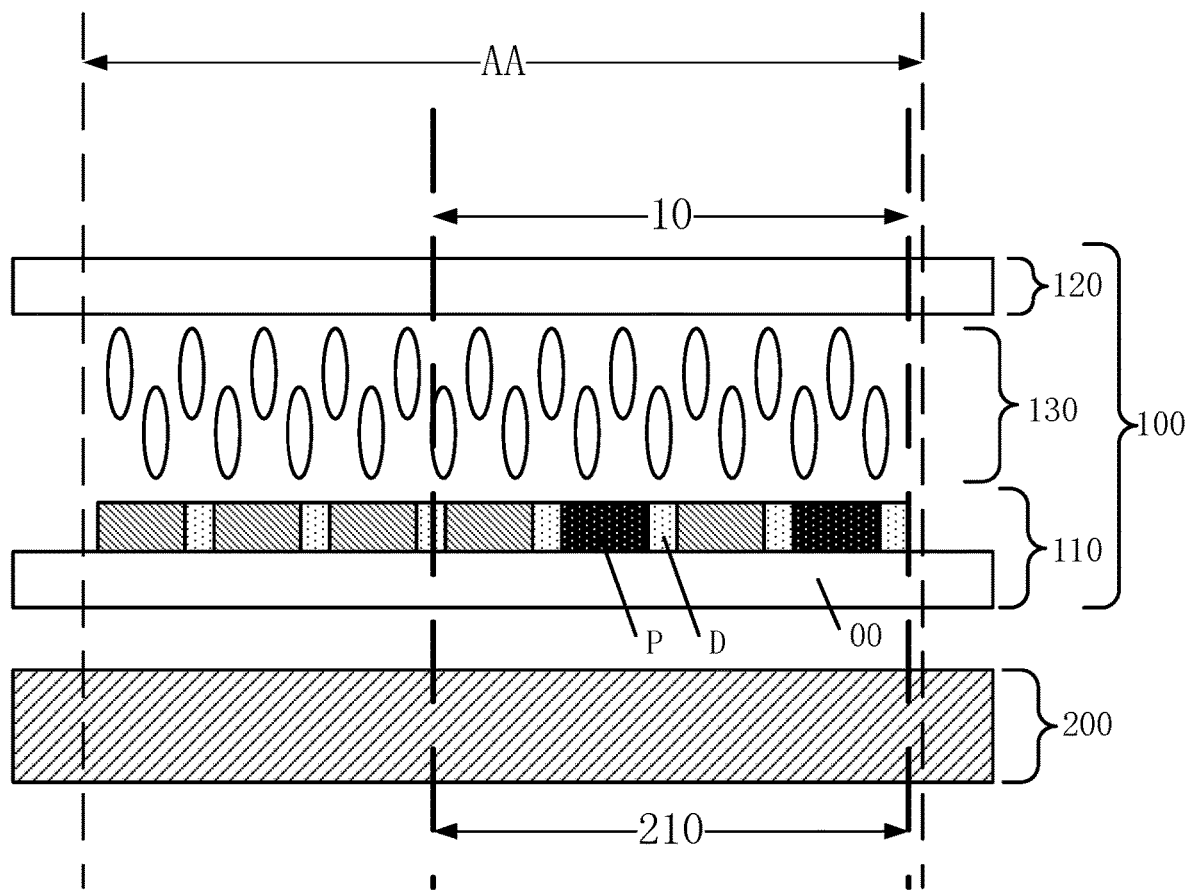
FIG. 9 illustrates a cross-section view of another exemplary display device corresponding to another exemplary driving method consistent with various disclosed embodiments in the present disclosure.

In some embodiments, as illustrated in FIG. 9 showing a cross-section view of a display device in another exemplary driving method provided by the present disclosure, the display device may include a display panel 100 and a backlight module 200 opposite to the display panel 100. The display panel 100 may include the plurality of pixels P. An orthographic projection of the touch control area 10 to the backlight module 200 may be a first area 210. At least a brightness of the first area 210 in the N fingerprint identification operations may be larger than the brightness of the first area 210 when detecting the touch control operation in the display area.

In some embodiments, the display panel may be a liquid crystal display panel including an array panel 110, a color film panel 120, and a liquid crystal layer 130. The array panel 110, the color film panel 120, and the liquid crystal layer 130 may be opposite to each other. The liquid crystal display panel is a passive light-emitting display panel and needs a backlight module for a light source.

An area in the backlight module corresponding to the touch control area 10 may be controlled as the first area 210. When detecting the touch control operation in the display area AA, the first area 210 may have a normal brightness and the display panel works normally. In the N fingerprint identification operations, the brightness of the first area 210 may be increased to be larger than the normal brightness of the first area 210. Then the electrical currents converted by corresponding optical sensors of the plurality of optical sensors D may increase and may be detected/identified easily. The fingerprint identification accuracy may be improved.

Backlight modules usually can be divided into side-in backlight modules and direct light backlight modules.

Figure 10:
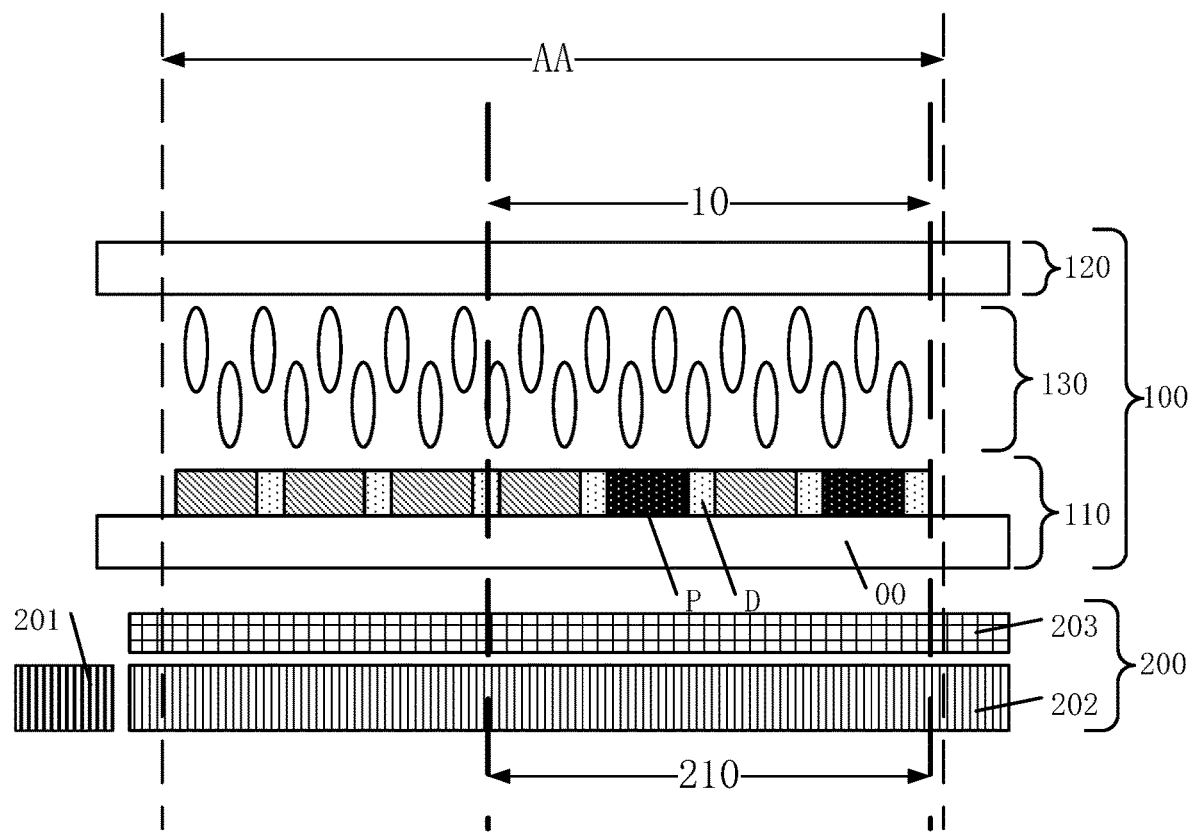
FIG. 10 illustrates a cross-section view of another exemplary display device corresponding to another exemplary driving method consistent with various disclosed embodiments in the present disclosure.

In some embodiments illustrated in FIG. 10 which shows a cross-section view of a display device in another exemplary driving method provided by the present disclosure, the backlight module may be an edge lighting backlight module. The backlight module 200 may include a side-in light strip 201, a light guide plate 202, and at least one optical film 203.

In the fingerprint identification operations, the backlight module 200 may have a brightness higher than a brightness of the backlight module 200 when detecting the touch control operation in the display region, and the pixels P outside the touch control area 10 may have a grayscale smaller than their grayscale when they display normally.

In some embodiment, the backlight module may be a side-in backlight module and the side-in light strip 201 may be disposed at a light incident surface of the light guide plate 202. In the light guide plate 202, the light incident surface may be connected to a light exit surface. Light beams emitted by the side-in light strip 201 may enter the light guide plate 202 and then exit from the light exit surface homogeneously after being reflected and/or refracted several times. The at least one optical film 203 may be used to improve a light utilization efficiency of the backlight module and/or to improve a uniformity of the brightness of the backlight module.

For description purposes only, the embodiment in FIG. 10 where the backlight module includes one optical film is used as an example to illustrate the present disclosure and should not limit the scopes of the present disclosure. In various embodiments, the backlight module may have any suitable number of optical films according to an actual demand of the display device, and the present disclosure has no limit on a number of optical films. For example, in one embodiment of the present disclosure, the backlight module may have two or more optical films. Also, the present disclosure has no limit on a structure of the side-in light strip 201. For example, in one embodiment, the side-in light strip 201 may have a plurality of light-emitting diodes.

Since the backlight module may be a side-in backlight module, a brightness in one area in the display area cannot be controlled independently. The brightness of the first area 210 in the N fingerprint identification operations may be increased to be higher than the brightness of the first area 210 when detecting the touch control operation in the display region. Correspondingly, the brightness of the whole backlight module may be increased. To guarantee a display effect of a portion of the display area AA except for the touch control area 10, the grayscale of the pixels P outside the touch control area 10 may be decreased to be lower than the grayscale of the pixels P outside the touch control area 10 when displaying normally. For example, in one embodiment, a content adaptive brightness control method (CABC) may be used to make the pixels P outside the touch control area 10 has the pixel voltage lower than the pixel voltage of the pixels P outside the touch control area 10 when displaying normally. Correspondingly, the grayscale of the pixels P outside the touch control area 10 may be decreased, to compensate an increase in the brightness of the backlight module. The display device may display normally.

In the present disclosure, the brightness of the bright pixels PA in the touch control area 10 may be increased to increase the electrical current converted by the corresponding optical sensors of the plurality of optical sensors. The large electrical current may be detected and/or identified easily, and the fingerprint identification accuracy may be improved. Also, the grayscale of the pixels P outside the touch control area 10 may be decreased, to compensate an increase in the brightness of the backlight module. The display device may display normally. A user experience may be improved.

Figure 11:
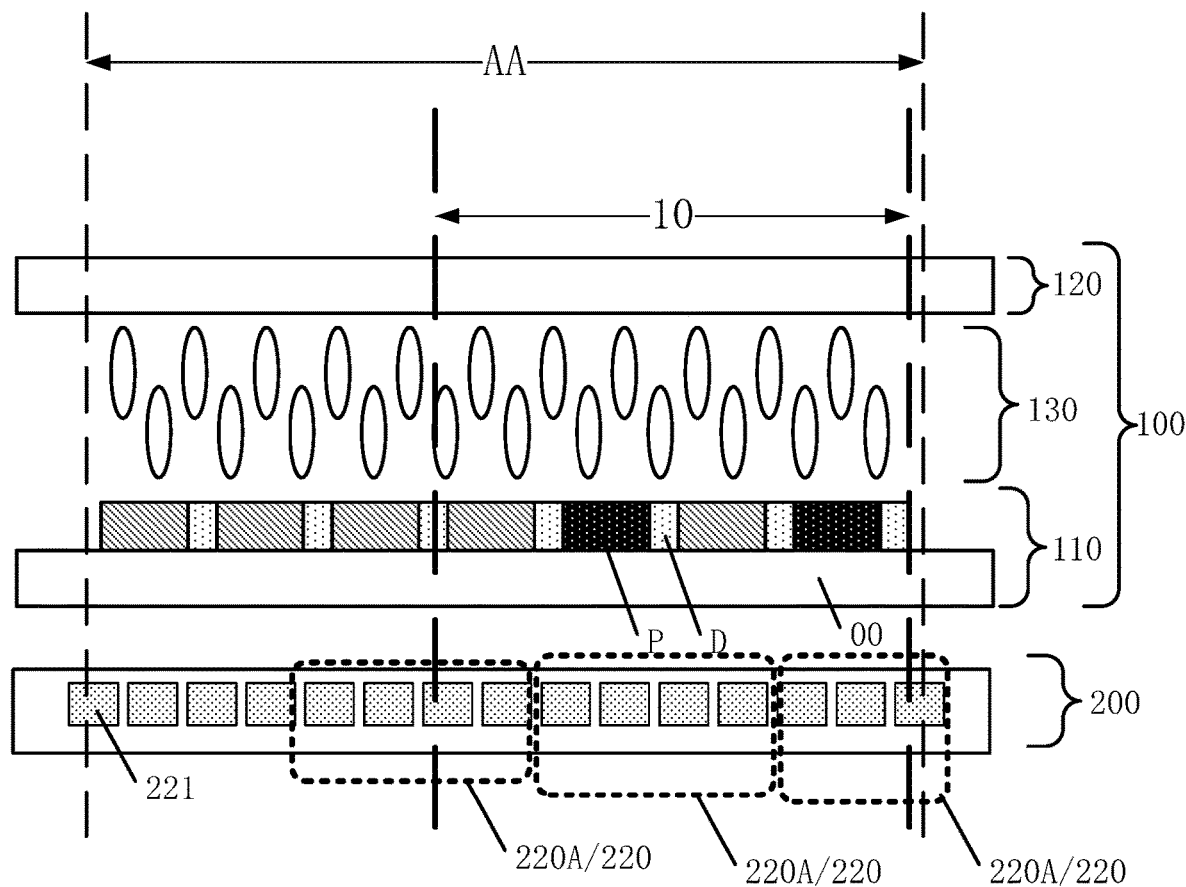
FIG. 11 illustrates a cross-section view of another exemplary display device corresponding to another exemplary driving method consistent with various disclosed embodiments in the present disclosure.
Figure 12:
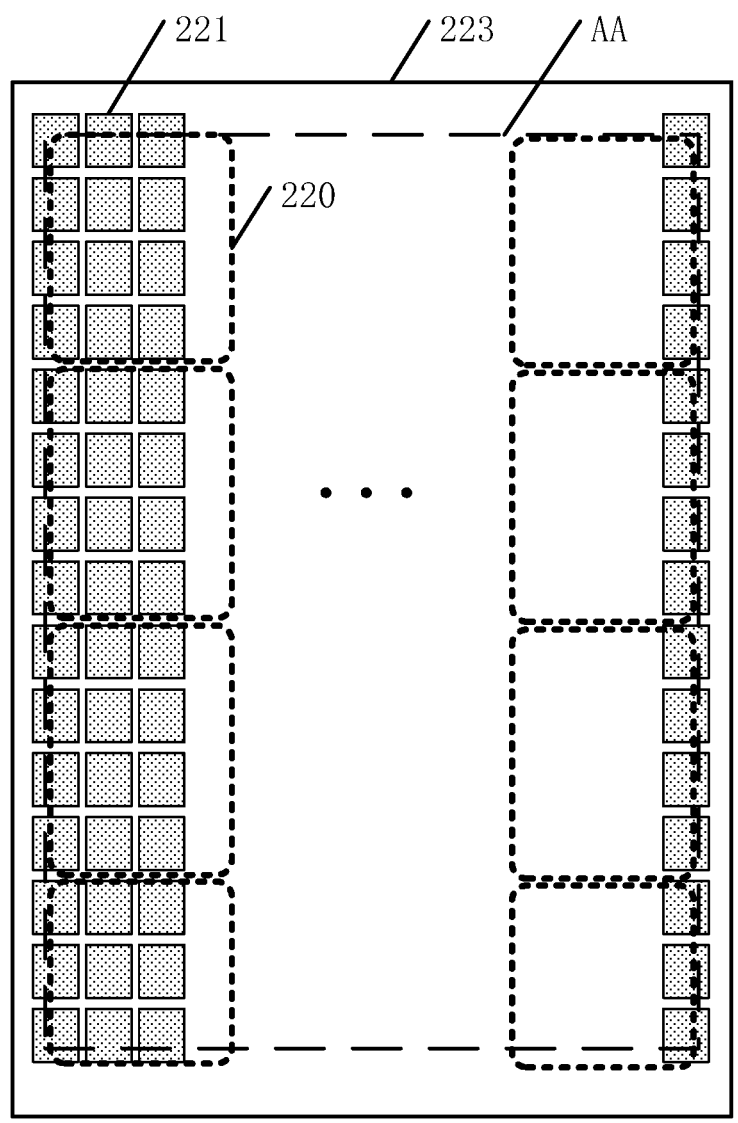
FIG. 12 illustrates a top-view structure of a backlight module in an exemplary display device consistent with various disclosed embodiments in the present disclosure.

In some other embodiments, the backlight module may be a direct light backlight module. As illustrated in FIG. 11 showing a cross-section view of a display device in another exemplary driving method and FIG. 12 showing a top-view structure of the backlight module in the display device in FIG. 11, the backlight module 200 may include a plurality of light-emitting areas 220, and each of the plurality of light-emitting areas 220 may include a plurality of light-emitting devices 221. The plurality of light-emitting devices 221 may be disposed on a base layer 223.

A portion of the plurality of light-emitting areas 220 overlapping with the first area 210 in the fingerprint identification operations may have a brightness higher than the brightness of the portion of the plurality of light-emitting areas 220 overlapping with the first area 210 when detecting the touch control operation in the display region AA.

Since the backlight module may be a direct light backlight module, each of the plurality of light-emitting areas 220 may be controlled independently and a brightness of each of the plurality of light-emitting areas 220 may be controlled independently. Each of the plurality of light-emitting devices may be a light-emitting diode (LED), a mini light-emitting diode (Mini LED), and/or a micro light-emitting diode (Micro LED). A LED may have a small size and a high light-emitting efficiency. A Mini LED is a sub-millimeter LED with a grain size between about 100 μm and about 1000 μm. The backlight module with Mini LEDs may have a high good production rate and can be cut irregularly. Also, the backlight module with Mini LEDs may form a backlight device with a high curvature together with a soft base panel. A micro LED is a LED with a grain size form about 1 μm to about 10 μm, and may be used to form a display screen with pixels smaller than 0.05 mm. A micro LED may consume a small amount of power and may have a good material stability without residual images.

In some embodiments, the portion of the plurality of light-emitting areas 220 overlapping with the first area 210 may belong to light-emitting areas 220A. When detecting the touch control operation in the display area AA, the light-emitting areas 220A may have a brightness for normal display. In the N fingerprint identification operations, the brightness of the light-emitting areas 220A may be increased to be higher than the brightness of the light-emitting areas 220A when displaying normally. A remain portion of the plurality of light-emitting areas 220 except the light-emitting areas 220A may have a brightness for normal display. A value of the brightness for normal display may be controlled according to the displayed images and the present disclosure has no limit on this.

In the present disclosure, only the brightness of the portion of the plurality of light-emitting areas 220 overlapping with the first area 210 may be increased. Correspondingly, the brightness of the bright pixels in the touch control area 10 may be increased to increase the electrical current converted by the plurality of optical sensors. The large electrical current may be detected and/or identified easily, and the fingerprint identification accuracy may be improved. The remaining portion of the plurality of light-emitting areas 220 which does not overlap with the first area 210 may have the brightness for normal display to avoid an influence on the display effect of the display device.

For description purposes only, above embodiments with detailed methods for increasing the grayscale of the pixels as the bright pixel are used as examples to illustrate the present disclosure and should not limit the scopes of the present disclosure. The present disclosure has no limit on the method for increasing the grayscale of the pixels as the bright pixel.

In the driving methods provided by various embodiments of the present disclosure, a portion of the pixels in the touch control area may be controlled as the bright pixel and a remaining portion of the pixels in the touch control area may be controlled as the black pixel. Correspondingly a grating pattern may be formed in the touch control area. The grating pattern may have different configurations.

Figure 13:
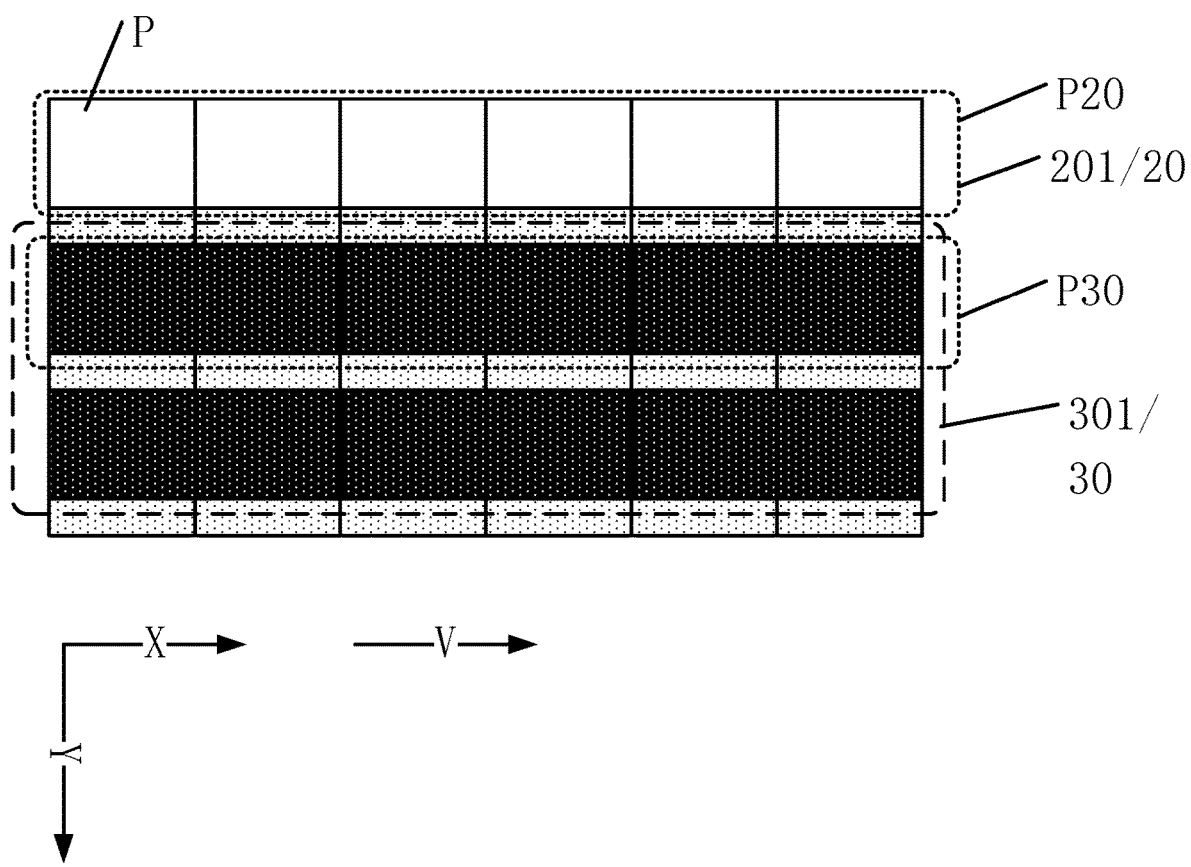
FIG. 13 illustrates a top-view structure of a touch control region in another exemplary driving method consistent with various disclosed embodiments in the present disclosure.

In some embodiments illustrated in FIG. 13 showing a top-view structure of the touch control area in another exemplary driving method, the plurality of pixels P may be disposed in an array along a first direction X and a second direction Y. The first direction X may intersect the second direction Y.

In each of the N fingerprint identification operations, a portion of the pixels P in the touch control area 10 may be controlled as the bright pixels and a remaining portion of the pixels P may be controlled as the black pixels, to form a grating pattern. The grating pattern may include a bright pixel area 20 and a black pixel area 30. In the touch control area 10, an area where pixels are the bright pixels may be the bright pixel area 20 and another area where the pixels are the black pixels may be the black pixel area 30.

The bright pixel area 20 may include at least one bright sub-area 201, and each bright sub-area 201 may include at least one bright pixel stripe P20. Each bright pixel stripe P20 may include a plurality of bright pixels P arranged along a third direction V.

The black pixel area 30 may include at least one black sub-area 301, and each black sub-area 301 may include at least one black pixel stripe P30. Each black pixel stripe P30 may include a plurality of black pixels arranged along the third direction V.

The at least one bright sub-area 201 and the at least one black sub-area 301 may be disposed adjacent to each other.

In one embodiment, light-emitting states of the pixels in the touch control area 10 may be controlled to form the grating pattern. All pixels in the bright pixel area 20 may be controlled as the bright pixels and all pixels in the black pixel area 30 may be controlled as the black pixels.

The bright pixel area 20 may include at least one bright sub-area 201. When the bright pixel area 20 includes two or more bright sub-areas 201, a black sub-area 301 may be disposed between every two bright sub-areas 201. Each bright sub-area 201 may include at least one bright pixel stripe P20. When each bright sub-area 201 includes two or more bright pixel stripes P20, there may be no black pixel stripe P30 between any two bright pixel stripes P20.

The black pixel area 30 may include at least one black sub-area 301. When the black pixel area 30 includes two or more black sub-areas 301, a bright sub-area 201 may be disposed between every two black sub-areas 301. Each black sub-area 301 may include at least one black pixel stripe P30. When each black sub-area 301 includes two or more black pixel stripes P30, there may not be any bright pixel stripe P20 between any two black pixel stripes P30.

In one embodiment illustrated in FIG. 13, the bright pixel area 20 may include one bright sub-area 201 and the bright sub-area 201 may include one bright pixel stripe P20. The black pixel area 30 may include one black sub-area 301 and the black sub-area 301 may include one black pixel stripe P30. This embodiment is used as an example to illustrate the present disclosure for description purposes only and should not limit the scopes of the present disclosure. In some other embodiments, there may be two or more bright sub-areas 201, two or more black sub-areas 301, two or more bright pixel stripes P20, and/or two or more black pixel stripes P30.

Figure 14:
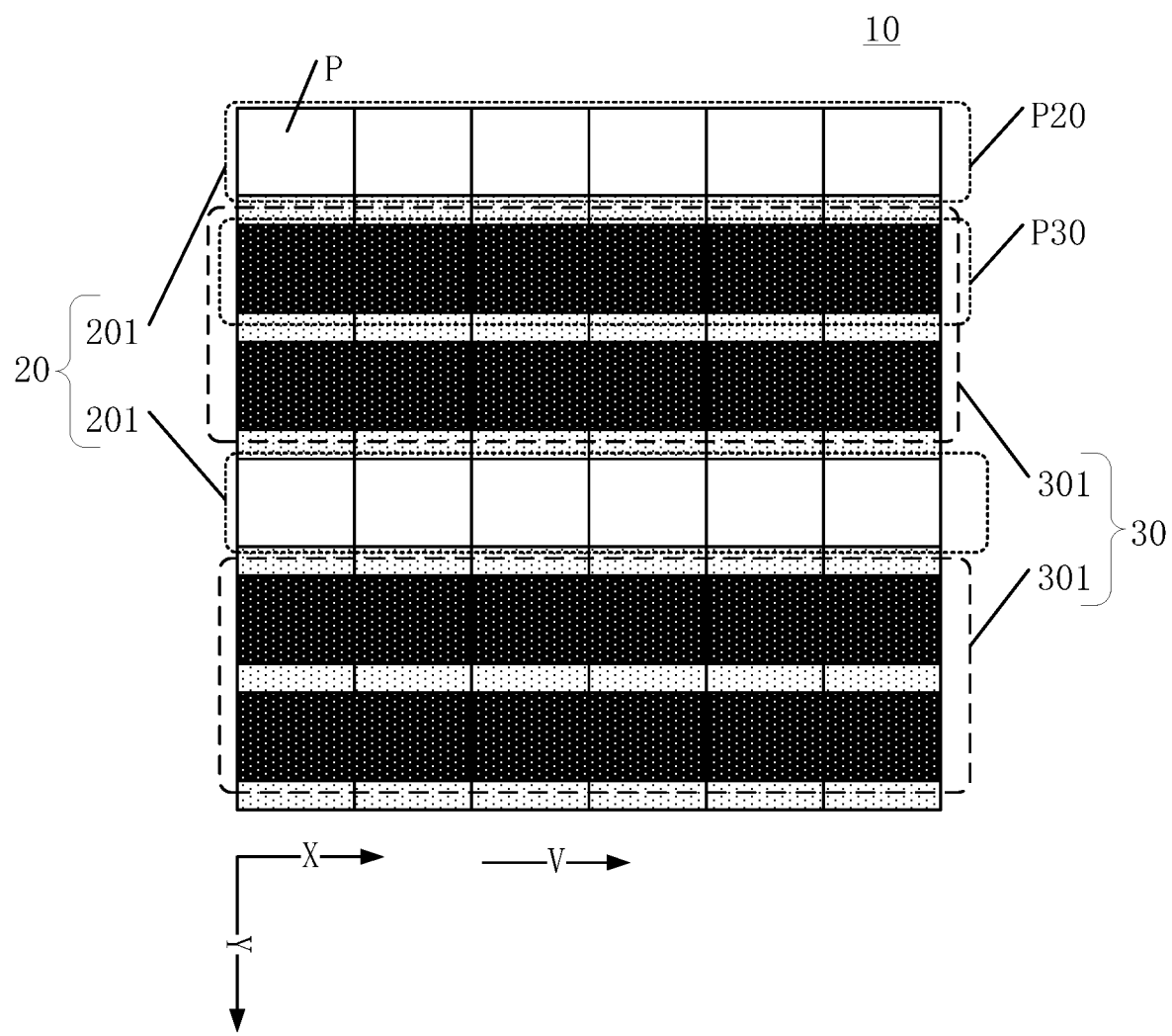
FIG. 14 illustrates a top-view structure of another touch control region in another exemplary driving method consistent with various disclosed embodiments in the present disclosure.

In one embodiment illustrated in FIG. 14, the bright pixel area 20 may include two bright sub-areas 201 and the black pixel area 30 may include two black sub-areas 301. Each black sub-area 301 may include at least two black pixel stripes P30 and the at least two black pixel stripes P30 may be disposed adjacent to each other. Correspondingly, in one black sub-area 301, there may not be any bright pixel stripe P20 between each black pixel stripe P30.

Figure 15:
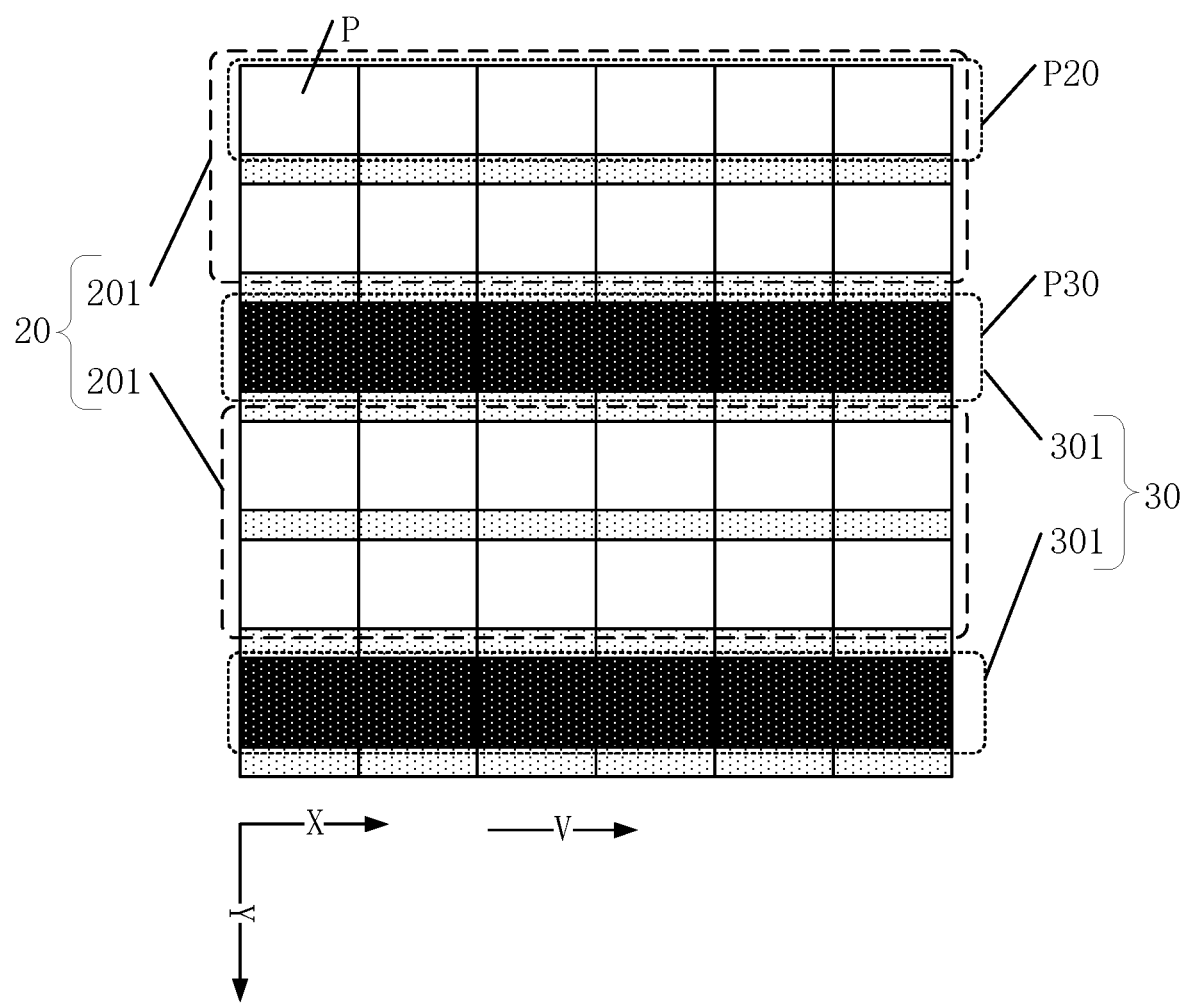
FIG. 15 illustrates a top-view structure of another touch control region in another exemplary driving method consistent with various disclosed embodiments in the present disclosure.

In one embodiment illustrated in FIG. 15, the bright pixel area 20 may include two bright sub-areas 201 and the black pixel area 30 may include two black sub-areas 301. Each bright sub-area 201 may include at least two bright pixel stripes P20. The at least two bright pixel stripes P20 may be disposed adjacent to each other. Correspondingly, in one bright sub-area 201, there may not be any black pixel stripe P30 between each bright pixel stripe P20.

In some other embodiments, each bright sub-area 201 may include at least two bright pixel stripes P20 disposed adjacent to each other and each black sub-area 301 may include at least two black pixel stripes P30 disposed adjacent to each other. Above embodiments with detailed configurations of the bright pixel area and the black pixel area are used as examples to illustrate the present disclosure for description purposes only and should not limit the scopes of the present disclosure. In various embodiments of the present disclosure, the bright pixel area and the black pixel area may have any suitable configurations.

Figure 16:
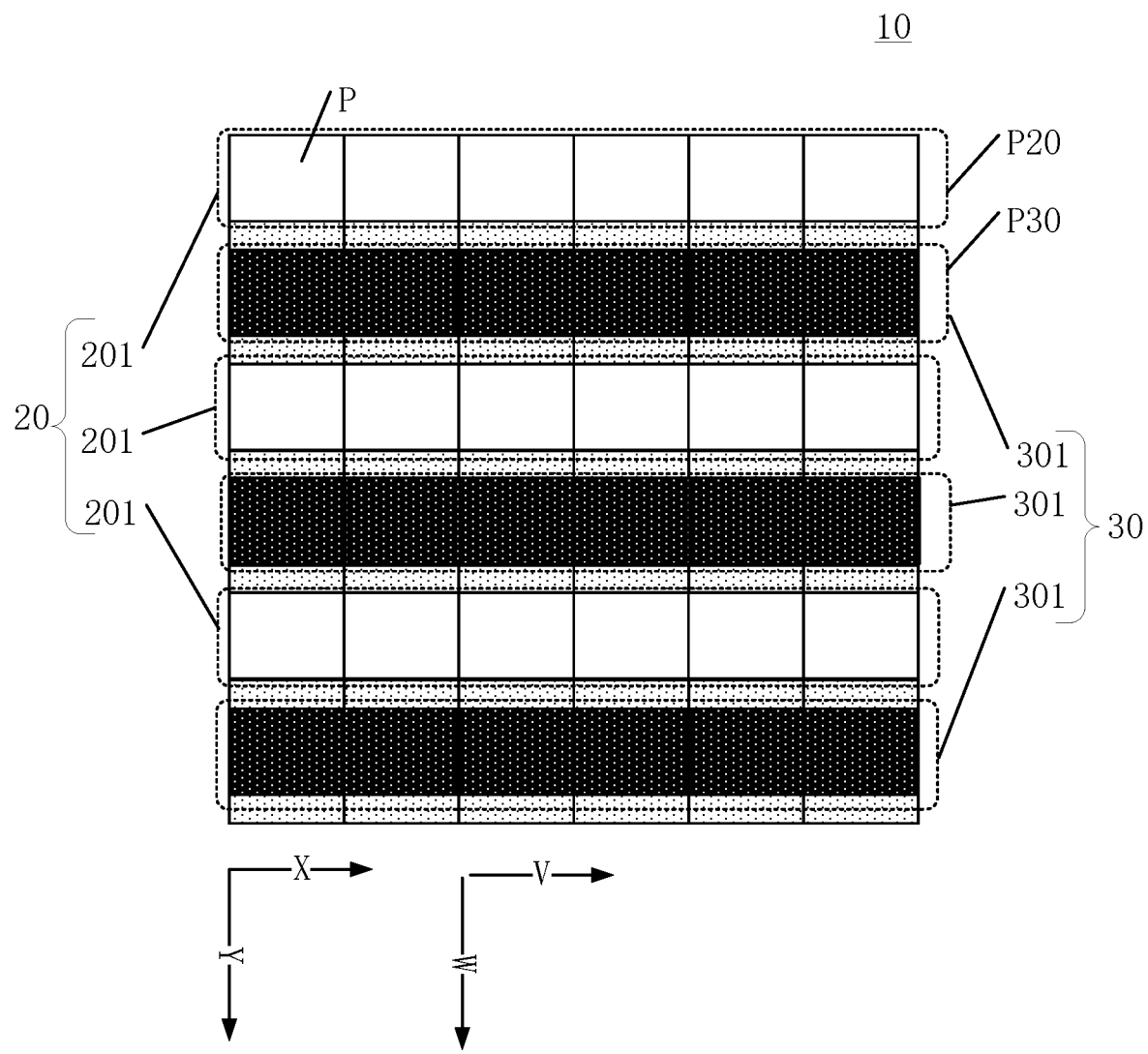
FIG. 16 illustrates a top-view structure of another touch control region in another exemplary driving method consistent with various disclosed embodiments in the present disclosure.

In one embodiment illustrated in FIG. 16 showing a top-view structure of the touch control area of another exemplary driving method, the bright pixel area 20 may include at least two bright sub-areas 201 and the black pixel area 30 may include at least two black sub-areas 301. The bright sub-areas 201 and the black sub-areas 301 may be disposed along a fourth direction W alternately. The fourth direction W may be perpendicular to the third direction V.

Figure 17:
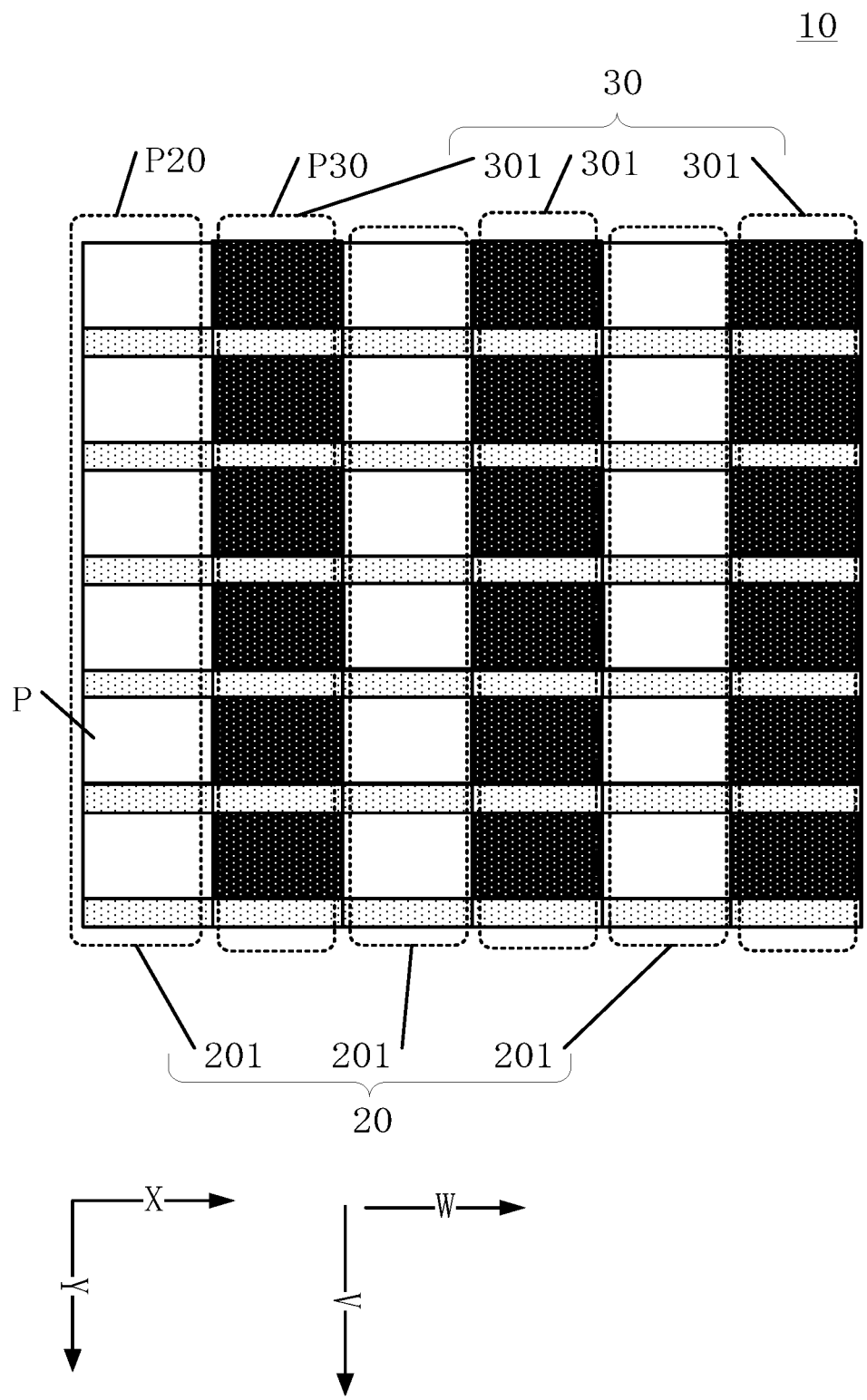
FIG. 17 illustrates a top-view structure of another touch control region in another exemplary driving method consistent with various disclosed embodiments in the present disclosure.

In the above embodiments with the grating patterns illustrated in FIGS. 13-16, the third direction V may be same as the first direction X. In some other embodiments, the third direction V may be same as the second direction Y. For example, in one embodiment illustrated in FIG. 17 showing a top-view structure of the touch control area of another exemplary driving method, the plurality of pixels P may be disposed in an array along the first direction X and the second direction Y. The first direction X may intersect the second direction Y. In the fingerprint identification operations, a portion of the pixels P in the touch control area 10 may be controlled as the bright pixels and a remaining portion of the pixels P may be controlled as the black pixels, to form a grating pattern. The grating pattern may include a bright pixel area 20 and a black pixel area 30. In the touch control area 10, an area where pixels are the bright pixels may be the bright pixel area 20 and another area where the pixels are the black pixels may be the black pixel area 30. The bright pixel area 20 may include one or more bright sub-areas 201, and each bright sub-area 201 may include one bright pixel stripe P20. The bright pixel stripe P20 may include a plurality of the bright pixels P arranged along the third direction V. The black pixel area 30 may include one or more black sub-areas 301, and each black sub-area 301 may include one black pixel stripe P30. The black pixel stripe P30 may include a plurality of the black pixels arranged along the third direction V. In one embodiment, the bright pixel area 20 may include three bright sub-areas 201 and the black pixel area 30 may include three black sub-areas 301. The bright sub-areas 201 and the black sub-areas 301 may be disposed alternately along the fourth direction W. The third direction V may be perpendicular to the fourth direction W.

In some other embodiments of the present disclosure, the third direction V and the first direction X may form an angle of about 45°.

Figure 18:
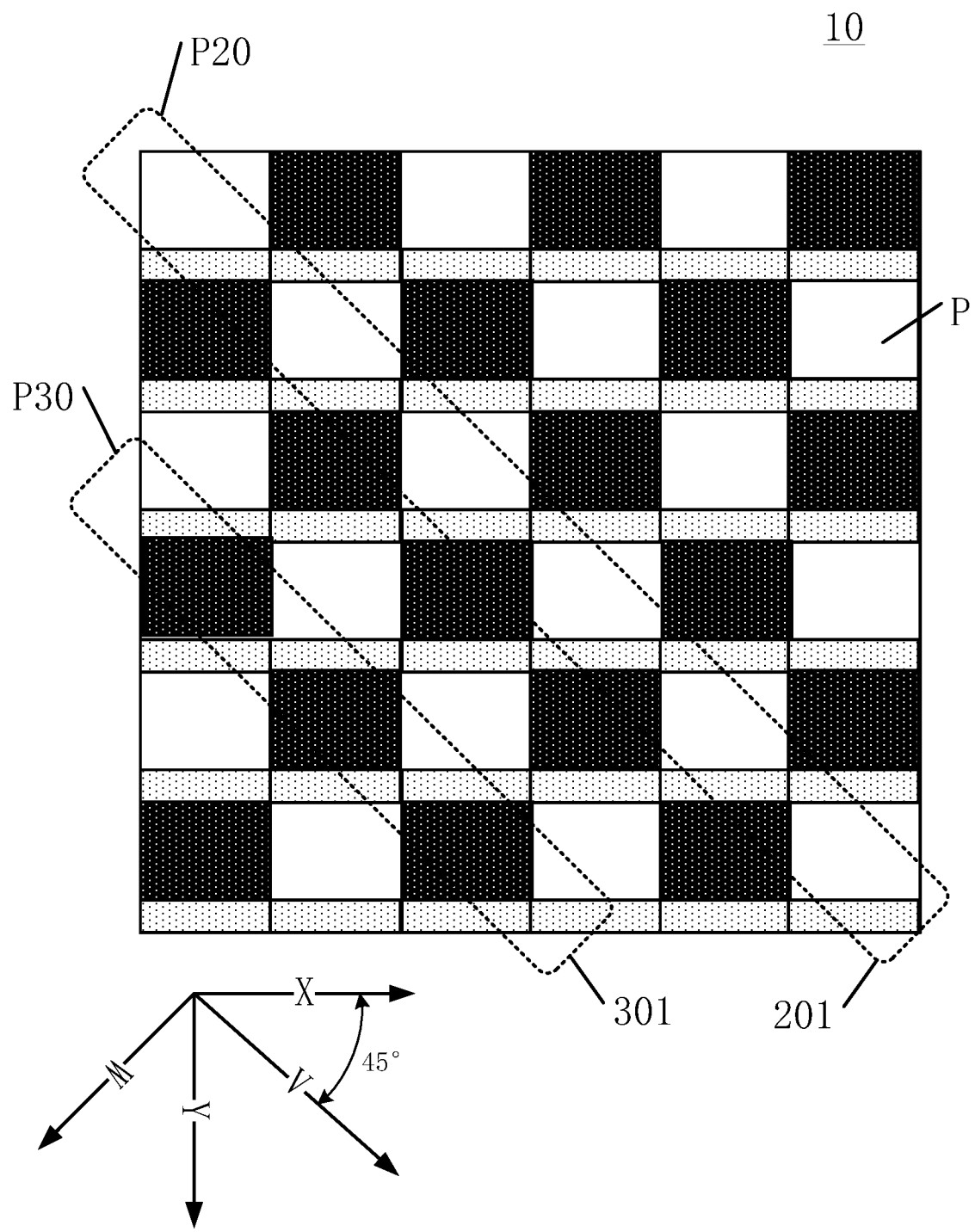
FIG. 18 illustrates a top-view structure of another touch control region in another exemplary driving method consistent with various disclosed embodiments in the present disclosure.

For example, FIG. 18 illustrates a top-view structure of the touch control area of another exemplary driving method. In the grating pattern illustrated in FIG. 18, the plurality of pixels P may be disposed in an array along the first direction X and the second direction Y. The first direction X may intersect the second direction Y. In the fingerprint identification operations, a portion of the pixels P in the touch control area 10 may be controlled as the bright pixels and a remaining portion of the pixels P may in the touch area 10 may be controlled as the black pixels, to form a grating pattern. The grating pattern may include a bright pixel area 20 and a black pixel area 30. In the touch control area 10, an area where pixels are the bright pixels may be the bright pixel area 20 and another area where the pixels are the black pixels may be the black pixel area 30. The bright pixel area 20 may include five bright sub-areas 201, and each bright sub-area 201 may include one bright pixel stripe P20. The bright pixel stripe P20 may include a plurality of the bright pixels P arranged along the third direction V. The black pixel area 30 may include six black sub-area 301, and each black sub-area 301 may include one black pixel stripe P30. The black pixel stripe P30 may include a plurality of the black pixels arranged along the third direction V. The bright sub-areas 201 and the black sub-areas 301 may be disposed alternately along the fourth direction W. The third direction V may be perpendicular to the fourth direction W. The third direction V and the first direction X may form an angle of about 45°.

In above embodiments illustrated in FIGS. 13-18 the grating patterns may include stripe patterns. Each bright sub-area 201 and each black sub-area 301 may be a stripe. In some other embodiments, the grating pattern may be a dot pattern.

Figure 19:
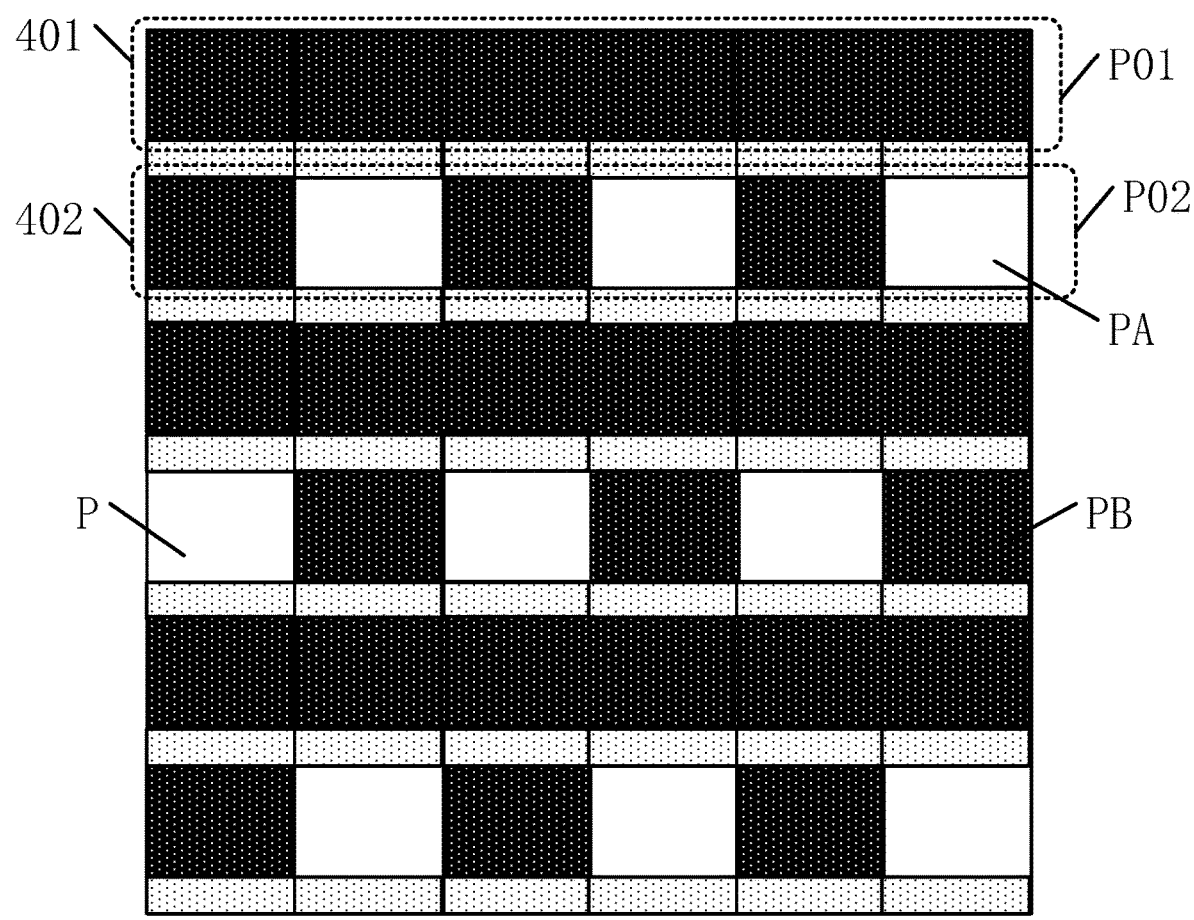
FIG. 19 illustrates a top-view structure of another touch control region in another exemplary driving method consistent with various disclosed embodiments in the present disclosure.

For example, FIG. 19 illustrates a top-view structure of the touch control area of another exemplary driving method. In the grating pattern illustrated in FIG. 19, the plurality of pixels P may be disposed in an array along the first direction X and the second direction Y. The first direction X may intersect the second direction Y. In each of the N fingerprint identification operations, a portion of the pixels P in the touch control area 10 may be controlled as the bright pixels and a remaining portion of the pixels P may be controlled as the black pixels, to form a grating pattern. The grating pattern may include at least one first sub-area 401 and at least one second sub-area 402. Each first sub-area 401 may include at least one first pixel stripe P01. Pixels in each first pixel stripe P01 may be arranged along the first direction X and may all be controlled as the black pixel. Each second sub-area 402 may include one second pixel stripe P02. Pixels P in one second pixel stripe P02 may be controlled as the black pixels and arranged in the first direction X. Each second pixel stripe P02 may include at least two bright pixels P. In one second pixel stripe P02, any two bright pixels may not be disposed adjacent to each other.

In the grating pattern of one embodiment, the bright pixels P may be disposed as dots, and all pixels around each bright pixel PA may be the black pixels PB. Light beams with large incident angles from any directions around the bright pixels PA may be reduced. An influence on the fingerprint identification by the light beams with large incident angles may be reduced and the fingerprint identification accuracy may be improved.

In some embodiments, the grating pattern may include at least two first sub-areas 401 and at least two second sub-areas 402. The at least two first sub-areas 401 and the at least two second sub-areas 402 may be disposed alternately along the second direction Y.

In the above embodiment, the grating pattern may include three first sub-areas 401 and three second sub-areas 402. Each first sub-area 401 may include at least one first pixel stripe P01. The embodiment is used as an example to illustrate the present disclosure for description purposes only and should not limit the scopes of the present disclosure. The present disclosure has no limit on a quantity of the first sub-areas 201, a quantity of the second sub-areas 301, a quantity of the first pixel stripes P01 in each first sub-area 201, and a quantity of the bright pixels PA in each second pixel stripe P02. In various embodiments, a quantity of the first sub-areas 201, a quantity of the second sub-areas 301, a quantity of the first pixel stripes P01 in each first sub-area 201, and a quantity of the bright pixels PA in each second pixel stripe P02, may be controlled according to actual demands.

The above embodiments with the grating pattern shown in FIGS. 13-19 are used as examples to illustrate the present disclosure for description purposes only and should not limit the scopes of the present disclosure. In various embodiments, the grating pattern may be any suitable pattern. The grating pattern may be controlled according to a condition of the light beams with large incident angles. If the display device has more light beams with large angles, the bright pixels may be disposed more sparsely in the grating pattern, to avoid the influence of the large-angle light beams from any directions. However, if the bright pixels are disposed more sparsely in the grating pattern, a longer time may be needed to open all pixels ergodically for the fingerprint identification. The arrangement of the bright pixels in the grating pattern may be controlled according to a severity of the large-angle light beams in the display device and the fingerprint identification time.

In the embodiments illustrated in FIGS. 13-19, the grating pattern is a regular pattern. In some other embodiments, bright pixels may be disposed randomly in the grating pattern, and correspondingly the grating pattern may be a random pattern.

The present disclosure also provides a display device. The display device may be driven by any driving method provided by various embodiments of the present disclosure.

Figure 20:
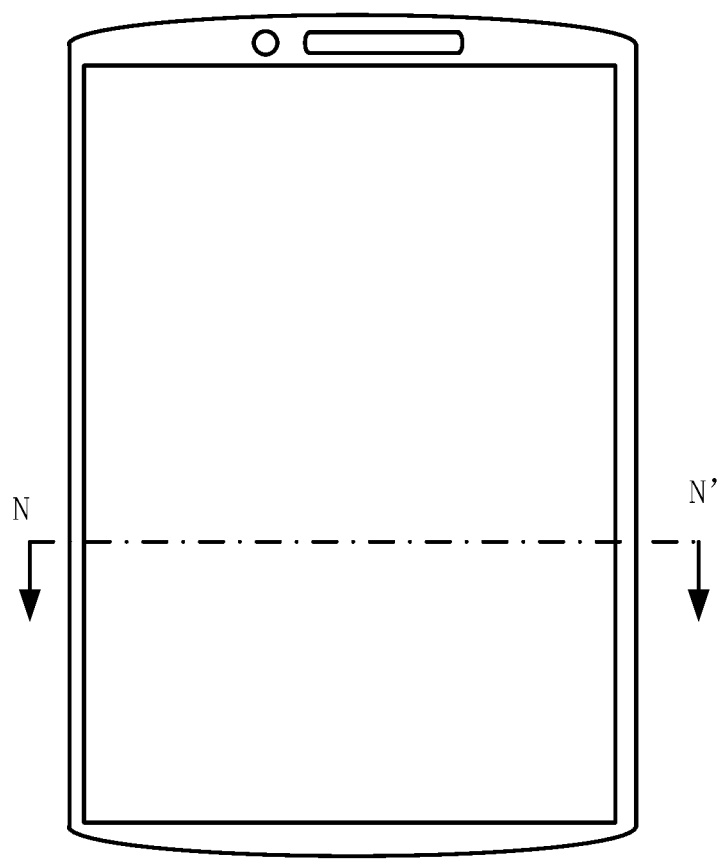
FIG. 20 illustrates another exemplary display device consistent with various disclosed embodiments in the present disclosure.

FIG. 20 illustrates an exemplary display device provided by one embodiment of the present disclosure. The display device 1000 may be driven by any driving method provided by various embodiments of the present disclosure. The embodiment where the display device 1000 shown in FIG. 20 is a cell phone is used as an example to illustrate the present disclosure for description purpose only and should not limit the scopes of the present disclosure. In various embodiments, the display device may be a computer, a television, a vehicle display device, or any other display device with a display function. In the present disclosure, the display device may have any advantages of the display panel provided by previous embodiments of the present disclosure.

Figure 21:
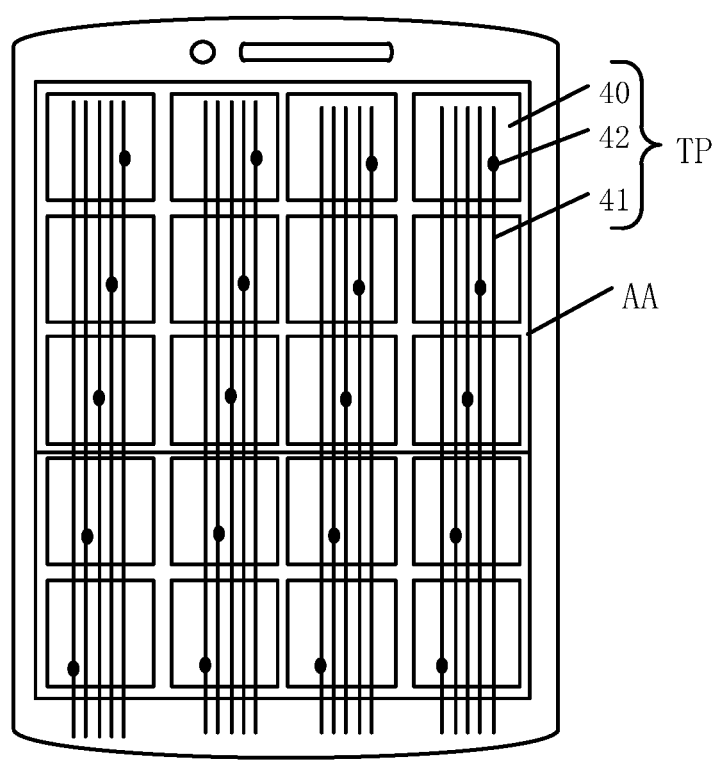
FIG. 21 illustrates a top-view structure of another exemplary display device consistent with various disclosed embodiments in the present disclosure.

In one embodiment illustrated in FIG. 21 showing a local structure of another exemplary display device, the display area AA may include a touch control module TP for detecting touch control operations in the display area AA.

The touch control module TP may be used to detect the touch control operations in the display area AA. The present disclosure has no limit on a structure and a working principle of the touch control module TP. In various embodiments, the touch control module TP may use any suitable working principles. For example, in one embodiment, the touch control module TP may be a capacitive touch control module and may detect the touch control operations by monitoring a change in capacitors. In some other embodiments, the touch control module TP may be a resistance touch control module, an inductive touch control module, and/or a light-sensor touch control module.

In one embodiment in FIG. 21, the touch control module TP may include a plurality of touch control electrodes 40 and a plurality of touch control wires 41. The plurality of touch control electrodes 40 may be electrically connected to the plurality of touch control wires 41. Optionally, the plurality of touch control electrodes 40 may be electrically connected to the plurality of touch control wires 41 through pass holes 42.

In one embodiment, the touch control module TP may be a capacitive touch control module. The working principle of the touch control module TP may be divided into a self-capacitive touch control or an inter-capacitive touch control. The touch control module TP with the self-capacitive touch control will be used as an example to illustrate the present disclosure.

A touch control detecting process for the plurality of touch control electrodes may include a preparation step and a detection step.

In the preparation step, the plurality of touch control wires may transfer touch control emitting signals to the plurality of touch control electrodes. The touch control emitting signals usually are pulse signals. The plurality of touch control electrodes may be charged by the touch control emitting signals and may form ground capacitances with the ground. The ground capacitance may be base capacitances when detecting the touch control operations.

In the detection step, when a touch control object (such as fingers) approaches or presses a surface of the display panel, coupling capacitances may be formed between the touch control object and a portion of the plurality of touch control electrodes at a position corresponding to the touch control object. The coupling capacitances may induce a change in the base capacitances and then a change in a charge in the portion of the plurality of touch control electrodes at the position corresponding to the touch control object. The change in the charge may induce detecting currents, and the plurality of touch control wires may transmit the detecting currents to a signal processing unit (not shown in the figures). The signal processing unit may determine a portion of the plurality of touch control electrodes where the touch control operation happens to detect a position information of the touch control operation by analyzing amplitudes of the detecting currents.

FIG. 21 only shows an embodiment as an example to illustrate the present disclosure for description purposes only and should not limit the scopes of the present disclosure. The present disclosure has no limits on shapes and sizes of the plurality of touch control electrodes. The display device may also include any other suitable structures not included in FIG. 21.

Figure 22:
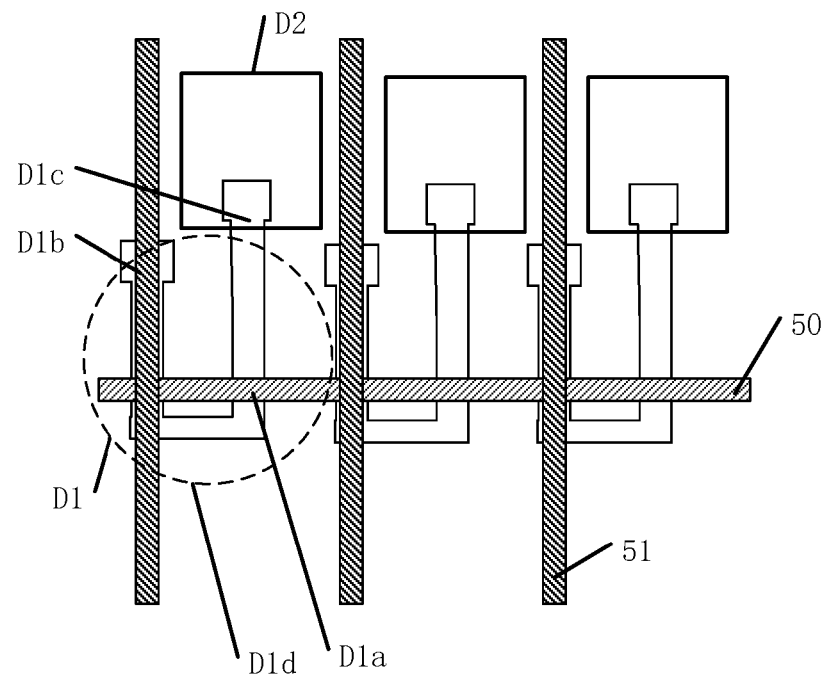
FIG. 22 illustrates a top-view structure of another exemplary display device consistent with various disclosed embodiments in the present disclosure.
Figure 23:
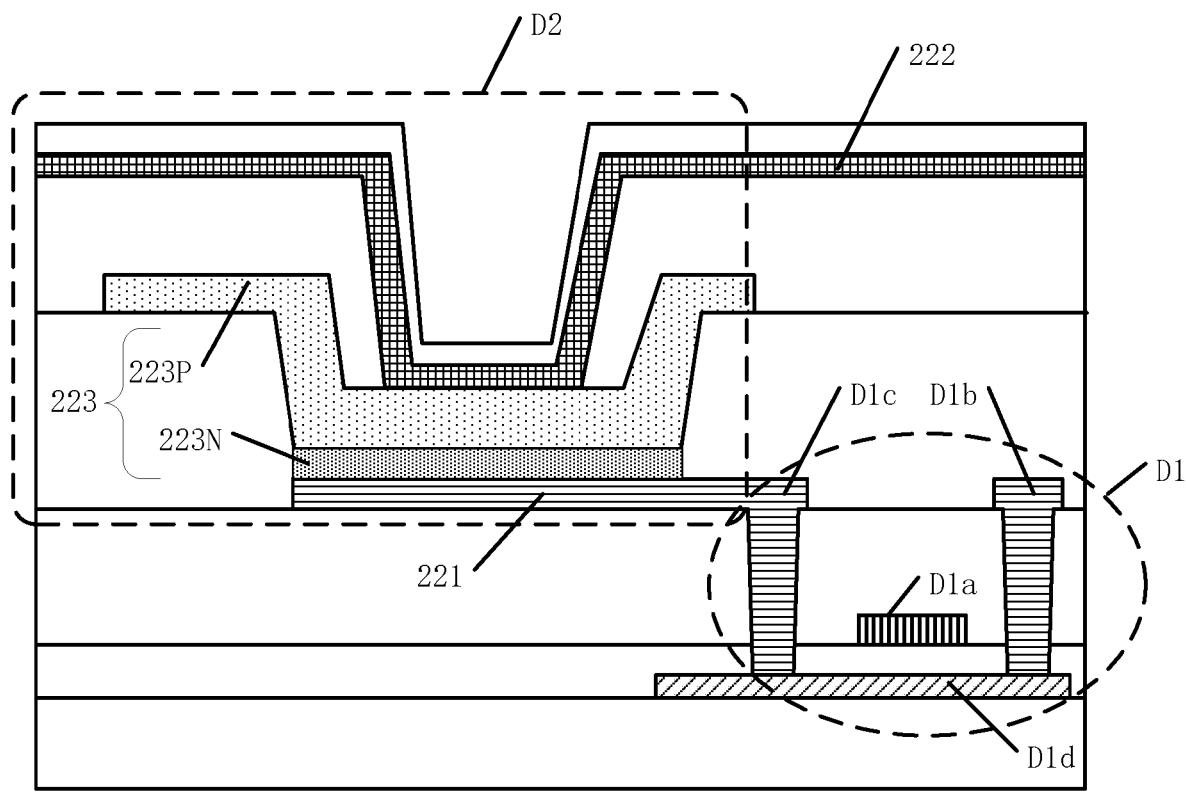
FIG. 23 illustrates a film-layer structure of the display device in FIG. 22.

In another embodiment illustrated in FIG. 22 showing a local structure of another exemplary display device and FIG. 23 showing a film layer structure of the display device in FIG. 21, the display area AA may include a plurality of control wires 50 and a plurality of signal wires 51. Each of the plurality of optical sensors D may include a light sensing switch D1 and a photodiode D2. Each light sensing switch D1 may include a gate electrode D1$a$, a first electrode D1$b$, a second electrode D1$c$, and an active layer D1$d$.

In one light sensing switch D1, the gate electrode may be electrically connected to one of the plurality of control wires 50, the first electrode D1$b$ may be electrically connected to one of the plurality of signal wires 51, and the second electrode D1$c$ may be electrically connected to the corresponding photodiode D2.

A key component of the photodiode D2 may be a PN junction 223. The PN junction may be formed by an N-type doped region (an N-type semiconductor part 223N) and a P-type doped region) a P-type semiconductor part 223P) tightly contacted with each other.

The first electrode 221 and the second electrode 222 may be used to provide an appropriate voltage to the corresponding PN junction 223, to control a conduction of the PN junction 223. In one embodiment, the first electrode 221 may be made of a material same as the second electrode D1$c$ of the corresponding light sensing switch D1 and be disposed in a layer same as the second electrode D1$c$ of the corresponding light sensing switch D1. The first electrode 221 and the second electrode D1$c$ of the corresponding light sensing switch D1 may be formed in one piece. A common electrode 50 in the display device may be reused as the second electrode 222 to provide a voltage to the corresponding PN junction 223. An extra structure for providing the voltage to the corresponding PN junction 223 may be avoided. A process and a cost for forming the display panel may be reduced. A light and thin display panel may be achieved.

For description purposes only, FIG. 20 only illustrate a local structure of a portion of the display device and FIG. 23 only illustrates a film layer structure of a portion of the display device in FIG. 20 and electrical relationships between the light sensing switch and the photodiode.

Figure 24:
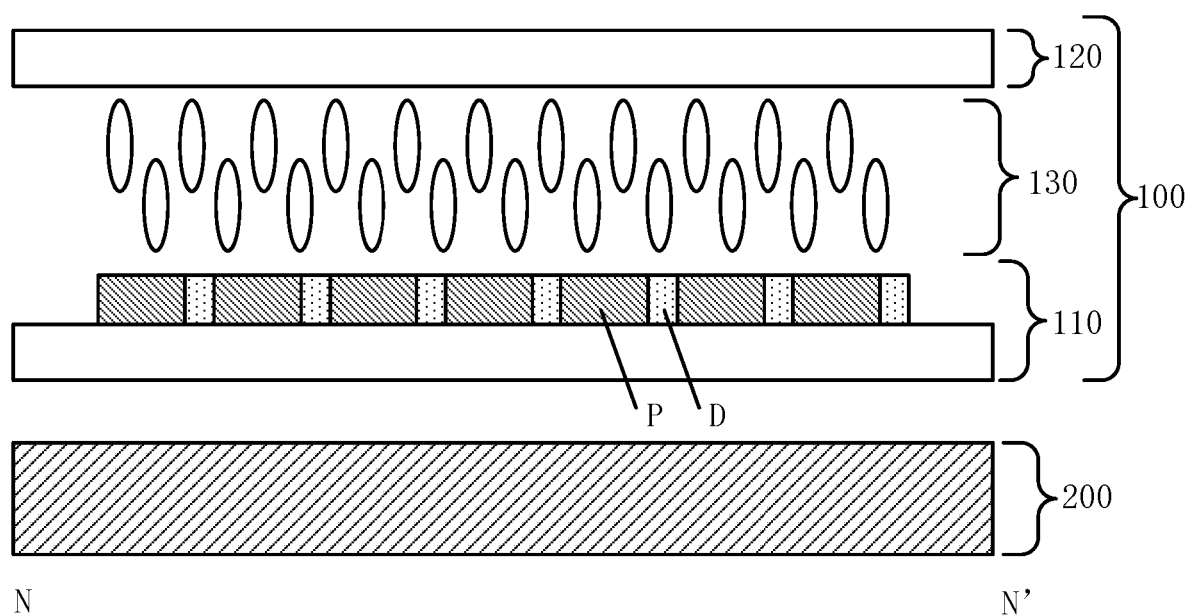
FIG. 24 illustrates a cross-section view of the display device in FIG. 20 along a CC' direction.

In another embodiment illustrated in FIG. 24 showing another cross-section view of the display device in FIG. 20 along the NN' direction, the display device may be a liquid crystal display device including a display panel 100 and a backlight module 200 opposite to the display panel 100. The display panel 100 may include an array panel 110, a colorful film panel 120, and a liquid crystal layer 130 between the array panel 110 and the colorful film panel 120.

The backlight module 200 may provide a light source for the liquid crystal display panel 100. The backlight module may be a direct lighting backlight module or an edge lighting backlight module.

In the display device and the driving method provided by the present disclosure, the display area of the display device may include a plurality of pixels and a plurality of optical sensors. The driving method may include detecting a touch control operation in the display area to determine the touch control area where the touch control operation happens and performing at least two fingerprint identification operations. The plurality of pixels may include pixels in the touch control area and pixels outside the touch control area. In the at least two fingerprint identification operations, a portion of the pixels in the touch control area may be controlled as the bright pixels and a remaining portion of the pixels in the touch control area may be controlled as the black pixels, while the pixels outside the touch control area may display normally. Each of the pixels in the touch control area may be controlled as the bright pixel in at least one of the at least two fingerprint identification operations. The plurality of optical sensors may receive and convert light signals to electrical signals. The electrical signals of the plurality of optical sensors may be analyzed to retrieve the fingerprint information. An influence of the light beams with a large angle on the fingerprint identification accuracy may be reduced and user experience of the display device may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A driving method for a display device, the display device including a display area, a plurality of pixels and a plurality of optical sensors in the display area, and a backlight module, the method comprising:
   detecting a touch control operation in the display area to determine a touch control area where the touch control operation is conducted, wherein an orthographic projection of the touch control area to the backlight module is a first area; and
   performing N fingerprint identification operations, each of the N fingerprint identification operations including:
      configuring a portion of the pixels in the touch control area as bright pixels and a remaining portion of the pixels in the touch control area as black pixels, and controlling the pixels outside the touch control area to perform a display function,
         wherein in the N fingerprint identification operations, each of the pixels in the touch control area is configured as the bright pixels in at least one of the N fingerprint identification operations, wherein N is an integer larger than or equal to 2, and
         wherein in each of the N fingerprint identification operations, a brightness of the first area of the backlight module is controlled to be higher than the brightness of the first area when detecting the touch control operation in the display area; and
      processing electrical signals from the plurality of optical sensors to retrieve fingerprint information, wherein the plurality of optical sensors receives light signals and converts the light signals to the electrical signals.

2. The driving method according to claim 1, wherein:
   in the N fingerprint identification operations, each of the pixels in the touch control area is controlled as the bright pixel in only one of the N fingerprint identification operations.

3. The driving method according to claim 1, wherein in each of the N fingerprint identification operations, the bright pixels in the touch control area have a brightness of a $255^{th}$ grayscale.

4. The driving method according to claim 1, wherein:
   the display device includes a display panel, the backlight module being controlled opposite to the display panel;
   the display panel includes the plurality of pixels.

5. The driving method according to claim 4, wherein:
   the backlight module includes a plurality of light-emitting areas;
   each of the plurality of light-emitting areas includes a plurality of light-emitting devices; and
   the method further includes:
      in each of the N fingerprint identification operations, controlling a brightness of a portion of the plurality of light-emitting areas overlapping with the first area higher than the brightness of the portion of the plurality of light-emitting areas overlapping with the first area when detecting the touch control operation in the display area.

6. The driving method according to claim 1, further including:
   controlling a portion of the plurality of pixels with the $255^{th}$ grayscale with a pixel voltage V1; and
   in each of the N fingerprint identification operations, controlling a pixel voltage V2 of the bright pixels in the touch control area larger than V1.

7. The driving method according to claim 1, wherein:
   the plurality of pixels is disposed in an array along a first direction and a second direction; and
   the first direction intersects the second direction.

8. The driving method according to claim 7, wherein:
   in each of the N fingerprint identification operations, a portion of the pixels in the touch control area is controlled as the bright pixels and a remaining portion of the pixels in the touch control area is controlled as the black pixels, to form a grating pattern;
   the grating pattern includes a bright pixel area where the pixels are controlled as the bright pixels and a black pixel area where the pixels are controlled as the black pixels;
   the bright pixel area includes at least one bright sub-area;
   each of the at least one bright sub-area includes at least one bright pixel stripe;
   each of the at least one bright pixel stripe includes a plurality of bright pixels arranged along a third direction;
   the black pixel area includes at least one black sub-area;
   each of the at least one black sub-area includes at least one black pixel stripe;
   each of the at least one black pixel stripe includes a plurality of black pixels arranged along a third direction; and
   the at least one bright sub-area and the at least one black sub-area are disposed adjacent to each other.

9. The driving method according to claim 8, wherein:
each black sub-area includes at least two black pixel stripes, and the at least two black pixel stripes are disposed adjacent to each other.

10. The driving method according to claim 8, wherein:
the display device has two bright sub-areas and two black sub-areas; and
the two bright sub-areas and the two black sub-areas are disposed alternately along a fourth direction perpendicular to the third direction.

11. The driving method according to claim 10, wherein an angle between the third direction and the first direction is 45°.

12. The driving method according to claim 8, wherein the third direction is along the first direction or along the second direction.

13. The driving method according to claim 7, wherein:
in each of the N fingerprint identification operations, a portion of the pixels in the touch control area is controlled as the bright pixels and a remaining portion of the pixels in the touch control area is controlled as the black pixels, to form a grating pattern;
the grating pattern includes at least one first sub-area and at least one second sub-area;
each of the at least one first sub-area includes at least one first pixel stripe where the pixels are the black pixel and are arranged along the first direction;
each of the at least one second sub-area includes one second pixel stripe where the pixels are arranged along the first direction;
the second pixel stripe includes at least two bright pixels; and
any two bright pixels of the at least two bright pixels in the second pixel stripe are not disposed adjacently.

14. A driving method for a display device, the display device including a display area and a plurality of pixels and a plurality of optical sensors in the display area, the method comprising:
detecting a touch control operation in the display area to determine a touch control area where the touch control operation is conducted; and
performing N fingerprint identification operations, each of the N fingerprint identification operations including:
configuring a portion of the pixels in the touch control area as bright pixels and a remaining portion of the pixels in the touch control area as black pixels, and controlling the pixels outside the touch control area to perform a display function,
wherein in the N fingerprint identification operations, each of the pixels in the touch control area is configured as the bright pixels in at least one of the N fingerprint identification operations, wherein N is an integer larger than or equal to 2; and
processing electrical signals from the plurality of optical sensors to retrieve fingerprint information, wherein the plurality of optical sensors receives light signals and converts the light signals to the electrical signals, wherein:
the display device includes a display panel and a backlight module controlled opposite to the display panel;
the display panel includes the plurality of pixels;
an orthographic projection of the touch control area to the backlight module is a first area; and the method further includes:
in each of the N fingerprint identification operations, at least controlling a brightness of the first area to be higher than the brightness of the first area when detecting the touch control operation in the display area;
the backlight module includes a side-in light strip, a light guide plate, and at least one optical film; and
the method further includes:
in each of the N fingerprint identification operations, controlling a brightness of the backlight module higher than the brightness of the backlight module when detecting the touch control operation in the display area; and
in each of the N fingerprint identification operations, controlling a grayscale of the pixels outside the touch control area lower than the grayscale of the second plurality pixels outside the touch control area when displaying normally.

15. A display device including a plurality of pixels, a plurality of optical sensors in a display area, and a backlight module, and driven by a driving method, wherein the driving method includes:
detecting a touch control operation in the display area to determine a touch control area where the touch control operation is conducted, wherein an orthographic projection of the touch control area to the backlight module is a first area; and
performing N fingerprint identification operations, each of the N fingerprint identification operations including:
configuring a portion of the pixels in the touch control area as bright pixels and a remaining portion of the pixels in the touch control area as black pixels, and controlling the pixels outside the touch control area to perform a display function,
wherein in the N fingerprint identification operations, each of the pixels in the touch control area is configured as the bright pixel in at least one of the N fingerprint identification operations, wherein N is an integer larger than or equal to 2, and
wherein in each of the N fingerprint identification operations, a brightness of the first area of the backlight module is controlled to be higher than the brightness of the first area when detecting the touch control operation in the display area; and
processing electrical signals from the plurality of optical sensors to retrieve fingerprint information, wherein the plurality of optical sensors receives light signals and converts the light signals to the electrical signals.

16. The display device according to claim 15, further including a touch control module for detecting touch control operations in the display area.

17. The display device according to claim 16, wherein:
the touch control module includes a plurality of touch control electrodes and a plurality of touch control wires; and
the plurality of touch control electrodes is electrically connected to a plurality of touch control wires.

18. The display device according to claim 15, further including a plurality of control wires and a plurality of signal wires in the display area, wherein:
each of the plurality of optical sensors includes a light sensing switch and a photodiode, wherein:
a gate electrode of the light sensing switch is electrically connected to the corresponding one of the pluralities of control wires;
a first electrode of the light sensing switch is electrically connected to the corresponding one of the pluralities of signal wires; and a second electrode of the light sensing switch is electrically connected to the corresponding photodiode.

19. The display device according to claim 18, wherein:
the photodiode in each of the plurality of optical sensors includes a PN junction, a first electrode, and a second electrode; and
the first electrode of the photodiode in each of the plurality of optical sensors is electrically connected to the second electrode of the corresponding light sensing switch.

20. The display device according to claim 15, wherein:
the display device is a liquid crystal display device including a display panel and a backlight module opposite to each other; and
the display panel includes an array panel, a colorful film panel, and a liquid crystal layer between the array panel and the colorful film panel.

\* \* \* \* \*